United States Patent
Shiraki

(10) Patent No.: US 12,221,548 B2
(45) Date of Patent: Feb. 11, 2025

(54) INK JET RECORDING INK AND IMAGE RECORDING METHOD

(71) Applicant: FUJIFILM Corporation, Tokyo (JP)

(72) Inventor: Fumiya Shiraki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 127 days.

(21) Appl. No.: 17/950,395

(22) Filed: Sep. 22, 2022

(65) Prior Publication Data
US 2023/0057093 A1    Feb. 23, 2023

Related U.S. Application Data

(63) Continuation of application No. PCT/JP2021/005489, filed on Feb. 15, 2021.

(30) Foreign Application Priority Data

Mar. 27, 2020  (JP) .................... 2020-058271

(51) Int. Cl.
C09D 11/322 (2014.01)
C09D 11/36 (2014.01)
C09D 11/38 (2014.01)

(52) U.S. Cl.
CPC .......... C09D 11/322 (2013.01); C09D 11/36 (2013.01); C09D 11/38 (2013.01)

(58) Field of Classification Search
CPC ....... C09D 11/52; C09D 11/38; C09D 11/326; C09D 11/106; C09D 11/107; C09D 11/104; C09D 11/322; C09D 11/36; B41J 2/01; B41M 5/00; B41M 5/0023
See application file for complete search history.

(56) References Cited

U.S. PATENT DOCUMENTS

| | | | |
|---|---|---|---|
| 10,266,710 B2* | 4/2019 | Gotou | C09D 11/322 |
| 2010/0216936 A1* | 8/2010 | Inushima | C09D 11/322 |
| | | | 524/548 |
| 2013/0321524 A1 | 12/2013 | Katsuragi | |
| 2014/0204156 A1 | 7/2014 | Gotou | |
| 2015/0035896 A1 | 2/2015 | Gotou et al. | |
| 2018/0311968 A1 | 11/2018 | Sato et al. | |
| 2019/0010349 A1 | 1/2019 | Shimono et al. | |
| 2019/0185691 A1 | 6/2019 | Takeshita et al. | |
| 2020/0216700 A1 | 7/2020 | Hongo | |

FOREIGN PATENT DOCUMENTS

| | | |
|---|---|---|
| CN | 103347964 A | 10/2013 |
| CN | 103935148 A | 7/2014 |
| CN | 109071986 A | 12/2018 |
| CN | 109715743 A | 5/2019 |
| EP | 2 151 483 A1 | 2/2010 |
| JP | 2014-140993 A | 8/2014 |
| JP | 2015-044405 A | 3/2015 |
| JP | 2017-186494 A | 10/2017 |
| JP | 2018-204012 A | 12/2018 |
| JP | 2019-059855 A | 4/2019 |
| WO | 2012/070243 A1 | 5/2012 |
| WO | 2018/062212 A1 | 4/2018 |
| WO | 2019/065071 A1 | 4/2019 |

OTHER PUBLICATIONS

International Search Report dated Apr. 27, 2021 in International Application No. PCT/JP2021/005489.
Written Opinion of the International Searching Authority dated Apr. 27, 2021 in International Application No. PCT/JP2021/005489.
International Preliminary Report on Patentability dated Sep. 22, 2022 in International Application No. PCT/JP2021/005489.
Chinese Office Action dated Feb. 4, 2023 in Chinese Application No. 202180023062.2.
Japanese Office Action dated Sep. 26, 2023 in Application No. 2022-509395.
Extended European Search Report dated Sep. 29, 2023 in Application No. 21774075.2.
Office Action issued Feb. 27, 2024 in Japanese Application No. 2022-509395.

* cited by examiner

*Primary Examiner* — Thinh H Nguyen
(74) *Attorney, Agent, or Firm* — Sughrue Mion, PLLC

(57) ABSTRACT

Provided are an ink jet recording ink including an organic solvent which is at least one selected from the group consisting of a compound represented by Formula 1 and a compound represented by Formula 2 and has a Clog P value of 1.0 to 3.5, resin particles which contain a resin having 1% by mass to 20% by mass of a structural unit represented by Formula 3 with respect to a total mass of the resin, a silicone-based surfactant, and water, and an image recording method. The description in Formula 1, Formula 2, and Formula 3 has been made in the specification.

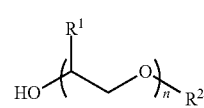

(1)

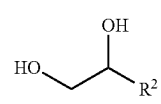

(2)

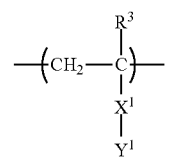

(3)

8 Claims, No Drawings

INK JET RECORDING INK AND IMAGE RECORDING METHOD

CROSS-REFERENCE TO RELATED APPLICATION

This application is a Continuation of International Application No. PCT/JP2021/005489, filed Feb. 15, 2021, which claims priority to Japanese Patent Application No. 2020-058271 filed Mar. 27, 2020. Each of the above applications is hereby expressly incorporated by reference, in its entirety, into the present application.

BACKGROUND OF THE INVENTION

1. Field of the Invention

The present invention relates to an ink jet recording ink and an image recording method.

2. Description of the Related Art

A recording method such as an electrophotographic method, a thermal transfer method, or an ink jet recording method has been used as an image recording method of recording an image on a recording medium such as paper based on an image data signal.

Since image recording carried out using the ink jet recording method does not require a printing plate and an image is recorded directly on a recording medium by jetting an ink only to an image recording unit, the ink can be efficiently used and the running cost is low. Further, an ink jet recording device is relatively low in cost as compared with other image recording devices, can be miniaturized, and has less noise. As described above, the ink jet recording method has various advantages over other image recording methods.

JP2018-204012A describes an ink jet aqueous ink containing a pigment, a fixing resin, an organic solvent, and water, in which the fixing resin is an A-B block polymer consisting of a specific A block and a specific B block, the content of a structural unit in the A block is in a range of 5% to 25% by mole with respect to the total molar amount of structural units in the A-B block polymer, the content of a structural unit containing an anionic functional group in the A block is 85% by mole or greater with respect to the total molar amount of the structural unit containing an anionic functional group in the A-B block polymer, and the acid value of the A-B block polymer is in a range of 5 to 80 mgKOH/g. Further, JP2017-186494A describes an ink composition for ink jet recording, containing at least a coloring material, a resin, and a specific solvent, in which the content of impurities derived from the solvent is less than 1.0% by mass with respect to the total amount of the solvent.

SUMMARY OF THE INVENTION

An ink for image recording carried out using the ink jet recording method is required to be excellent both in image quality and jettability in some cases. In JP2018-204012A and JP2017-186494A described above, achievement of both the image quality and the jettability has not been examined.

An object to be achieved by an aspect of the present invention is to provide an ink jet recording ink that is capable of forming an image with excellent graininess and has excellent jettability, and an image recording method using the ink jet recording ink.

The present disclosure includes the following aspects.

<1> An ink jet recording ink comprising: a pigment; a dispersant; an organic solvent which is at least one selected from the group consisting of a compound represented by Formula 1 and a compound represented by Formula 2 and has a Clog P value of 1.0 to 3.5; resin particles which contain a resin having 1% by mass to 20% by mass of a structural unit represented by Formula 3 with respect to a total mass of the resin; a silicone-based surfactant; and water.

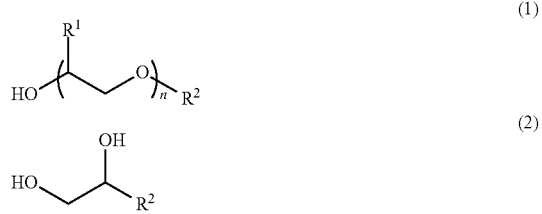

In Formula 1 or 2, $R^1$s each independently represent a hydrogen atom or a methyl group, $R^2$'s each independently represent a linear or branched hydrocarbon group having 4 to 9 carbon atoms, or an aryl group having 6 to 10 carbon atoms, and n represents an integer of 1 to 3.

$$-\!\!\left(\!CH_2\!-\!\!\underset{\underset{Y^1}{|}}{\overset{\overset{R^3}{|}}{C}}\!\right)\!\!- \qquad (3)$$

In Formula 3, $R^3$ represents a hydrogen atom or an alkyl group having 1 to 4 carbon atoms, $X^1$ represents a divalent linking group, $Y^1$ represents an anionic group, and an atom included in $X^1$ or $Y^1$ and farthest from a main chain is separated from the main chain by a distance of 4 atoms to 27 atoms.

<2> The ink jet recording ink according to <1>, having a dynamic surface tension at 10 milliseconds of 35 mN/m or less.

<3> The ink jet recording ink according to <1> or <2>, in which a content of the organic solvent is 2.5% by mass or greater with respect to a total mass of the ink.

<4> The ink jet recording ink according to any one of <1> to <3>, in which a content of the silicone-based surfactant is in a range of 0.03% by mass to 0.8% by mass with respect to a total mass of the ink.

<5> The ink jet recording ink according to any one of <1> to <5>, in which the resin has 5% by mass to 90% by mass of a structural unit derived from an ethylenically unsaturated compound having an aromatic ring structure or an alicyclic structure with respect to the total mass of the resin.

<6> An image recording method comprising: a step of applying the ink jet recording ink according to any one of <1> to <5> onto a recording medium using an ink jet recording method, to record an image.

According to the present disclosure, it is possible to provide an ink jet recording ink that is capable of forming an image with excellent graininess and has excellent jettability, and an image recording method using the ink jet recording ink.

DESCRIPTION OF THE PREFERRED EMBODIMENTS

In the present disclosure, a numerical range shown using "to" indicates a range including the numerical values described before and after "to" as a lower limit and an upper limit.

In the present disclosure, in a case where a plurality of substances corresponding to respective components in a composition are present, the amount of the respective components in the composition indicates the total amount of the plurality of substances present in the composition unless otherwise specified.

In a numerical range described in a stepwise manner in the present disclosure, an upper limit or a lower limit described in a certain numerical range may be replaced with an upper limit or a lower limit in another numerical range described in a stepwise manner or a value described in an Example.

In the present disclosure, the meaning of the term "step" includes not only an independent step but also a step whose intended purpose is achieved even in a case where the step is not clearly distinguished from other steps.

In the present disclosure, a combination of preferred embodiments is a more preferred embodiment.

In the present disclosure, the concept of "(meth)acryl" includes both acryl and methacryl, and the concept of "(meth)acrylate" includes both acrylate and methacrylate.

[Ink Jet Recording Ink]

An ink jet recording ink according to the present disclosure (hereinafter, also simply referred to as "ink") contains a pigment, a dispersant, an organic solvent which is at least one selected from the group consisting of a compound represented by Formula 1 and a compound represented by Formula 2 and has a Clog P value of 1.0 to 3.5, resin particles which contain a resin having 1% by mass to 20% by mass of a structural unit represented by Formula 3 with respect to the total mass of the resin, a silicone-based surfactant, and water.

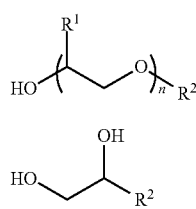

(1)

(2)

In Formula 1 or 2, $R^1$s each independently represent a hydrogen atom or a methyl group, $R^2$'s each independently represent a linear or branched hydrocarbon group having 4 to 9 carbon atoms, or an aryl group having 6 to 10 carbon atoms, and n represents an integer of 1 to 3.

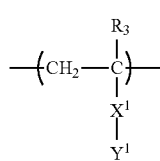

(3)

In Formula 3, $R^3$ represents a hydrogen atom or an alkyl group having 1 to 4 carbon atoms, $X^1$ represents a divalent linking group, $Y^1$ represents an anionic group, and an atom included in $X^1$ or $Y^1$ and farthest from a main chain is separated from the main chain by a distance of 4 atoms to 27 atoms.

An image with excellent graininess can be obtained by using the ink of the present disclosure, and the ink of the present disclosure has excellent jettability. Hereinafter, these effects will be described in detail.

The ink according to the present disclosure contains a silicone-based surfactant and thus is unlikely to adhere to a nozzle from which the ink is jetted. Therefore, the ink of the present disclosure is considered to have excellent jettability.

Since the ink according to the present disclosure contains an organic solvent which is at least one selected from the group consisting of a compound represented by Formula 1 and a compound represented by Formula 2 and has a Clog P value of 1.0 to 3.5, the surface tension of the ink is low. Therefore, the ink droplets easily spread in a case of landing on a recording medium, and landing interference is suppressed. The landing interference denotes a phenomenon in which ink droplets landed first and ink droplets landed later are united. In a case where the landing interference occurs, the image density is uneven, and the image gives an impression of being rough. The roughness of the image is also referred to as "graininess". Since the landing interference is suppressed in a case where the ink of the present disclosure is used, an image with excellent graininess can be obtained.

Further, the ink according to the present disclosure contains resin particles containing a resin that has 1% by mass to 20% by mass of a structural unit represented by Formula 3 with respect to the total mass of the resin. The structural unit represented by Formula 3 is a structural unit derived from a monomer containing an anionic group and is highly hydrophobic due to a relatively long side chain. The hydrophobicity of the entirety of resin particles increases as the hydrophobicity of the structural unit derived from an anionic group-containing monomer increases. In this manner, after the ink droplets land on the recording medium, the resin particles contained in the ink droplets are easily fixed on the recording medium, and the landing interference is suppressed. Therefore, it is considered that an image with excellent graininess can be obtained by using the ink of the present disclosure. Further, it is considered that since the hydrophobicity of the entirety of the resin particles is high, the resin particles are unlikely to swell, and the ink according to the present disclosure has excellent jettability.

Hereinafter, each component contained in the ink according to the present disclosure will be described.

<Pigment>

The ink according to the present disclosure contains a pigment. The kind of pigment is not particularly limited, and any of an organic pigment or an inorganic pigment may be used. Examples of the pigment include pigments described in "Encyclopedia of Pigments" edited by Seishiro Ito (2000), "Industrial Organic Pigments", W. Herbst, K. Hunger, JP2002-12607A, JP2002-188025A, JP2003-26978A, and JP2003-342503A.

From the viewpoint of the jettability of the ink, the content of the pigment is preferably in a range of 0.5% by mass to 15% by mass and more preferably in a range of 1% by mass to 10% by mass with respect to the total mass of the ink.

<Water>

The ink according to the present disclosure contains water.

The content of water is preferably in a range of 10% by mass to 99% by mass, more preferably in a range of 30% by mass to 80% by mass, and still more preferably in a range of 50% by mass to 70% by mass with respect to the total mass of the ink.

<Organic Solvent>

The ink according to the present disclosure contains an organic solvent. The organic solvent used in the present disclosure is at least one selected from the group consisting of a compound represented by Formula 1 and a compound represented by Formula 2.

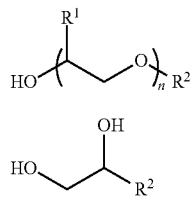

In Formula 1 or 2, $R^1$s each independently represent a hydrogen atom or a methyl group, $R^2$'s each independently represent a linear or branched hydrocarbon group having 4 to 9 carbon atoms, or an aryl group having 6 to 10 carbon atoms, and n represents an integer of 1 to 3.

In Formula 1, it is preferable that $R^1$ represents a hydrogen atom from the viewpoint of decreasing the surface tension of the ink.

In Formula 1, it is preferable that n represents 1 or 2 from the viewpoint of decreasing the surface tension of the ink.

In Formulae 1 and 2, examples of the linear or branched hydrocarbon group having 4 to 9 carbon atoms as $R^2$ include an n-butyl group, a t-butyl group, an n-pentyl group, an n-hexyl group, and a 2-ethylhexyl group.

In Formulae 1 and 2, examples of the aryl group having 6 to 10 carbon atoms as $R^2$ include a phenyl group, a p-toluyl group, an m-toluyl group, a 2,6-dimethylphenyl group, a 4-t-butylphenyl group, a 4-methoxyphenyl group, a 4-butoxyphenyl group, a 2-chlorophenyl group, and a naphthyl group.

Among these, from the viewpoint of setting the Clog P value to be in a range of 1.0 to 3.5, $R^2$ represents preferably a linear or branched hydrocarbon group having 4 to 9 carbon atoms, more preferably a linear or branched hydrocarbon group having 6 to 8 carbon atoms, and still more preferably an n-hexyl group or a 2-ethylhexyl group.

The Clog P value of the organic solvent used in the present disclosure is in a range of 1.0 to 3.5, and from the viewpoint of further improving the graininess of the image to be obtained, the Clog P value thereof is preferably in a range of 1.5 to 3.0 and more preferably in a range of 1.8 to 2.9.

In a case where the Clog P value of the organic solvent is 1.0 or greater, the hydrophobicity can be said to be high. The surface tension of the ink is low in a case where the Clog P value of the organic solvent in the ink according to the present disclosure is 1.0 or greater. Therefore, the ink droplets easily spread in a case of landing on a recording medium, and landing interference is suppressed. Since the landing interference is suppressed in a case where the ink of the present disclosure is used, an image with excellent graininess can be obtained. Further, in a case where the Clog P value of the organic solvent is 3.5 or less, the hydrophobicity is not extremely high and the jettability is excellent.

In the present disclosure, the Clog P value of the organic solvent is calculated using a fragment method. Examples of calculation software that uses the fragment method include ChemDraw Professional 16.

From the viewpoint of further decreasing the surface tension of the ink, the content of the organic solvent is preferably 2.5% by mass or greater with respect to the total mass of the ink. The upper limit of the content of the organic solvent is not particularly limited, but is preferably 30% by mass from the viewpoint of ink drying properties.

Examples of the organic solvent represented by Formula 1 or 2 which has a Clog P value of 1.0 to 3.5 include ethylene glycol monoalkyl ether such as ethylene glycol monopentyl ether, ethylene glycol monohexyl ether, ethylene glycol monoheptyl ether, ethylene glycol monooctyl ether, ethylene glycol monononyl ether, or ethylene glycol mono-2-ethylhexyl ether, diethylene glycol monoalkyl ether such as diethylene glycol monopentyl ether, diethylene glycol monohexyl ether, diethylene glycol monoheptyl ether, diethylene glycol monooctyl ether, diethylene glycol monononyl ether, or diethylene glycol mono-2-ethylhexyl ether, triethylene glycol monoalkyl ether such as triethylene glycol monopentyl ether, triethylene glycol monohexyl ether, triethylene glycol monoheptyl ether, triethylene glycol monooctyl ether, triethylene glycol monononyl ether, or triethylene glycol mono-2-ethylhexyl ether, propylene glycol monoalkyl ether such as propylene glycol monobutyl ether, propylene glycol monopentyl ether, propylene glycol monohexyl ether, propylene glycol monoheptyl ether, propylene glycol monooctyl ether, or propylene glycol mono-2-ethylhexyl ether, dipropylene glycol monoalkyl ether such as dipropylene glycol monobutyl ether, dipropylene glycol monopentyl ether, dipropylene glycol monohexyl ether, dipropylene glycol monoheptyl ether, dipropylene glycol monooctyl ether, or dipropylene glycol mono-2-ethylhexyl ether, tripropylene glycol monoalkyl ether such as tripropylene glycol monobutyl ether, tripropylene glycol monopentyl ether, tripropylene glycol monohexyl ether, tripropylene glycol monoheptyl ether, tripropylene glycol monooctyl ether, or tripropylene glycol mono-2-ethylhexyl ether, and alkanediol such as 1,2-heptanediol, 1,2-octanediol, 1,2-nonanediol, or 1,2-decanediol.

Among these, ethylene glycol monoalkyl ether, diethylene glycol monoalkyl ether, or alkanediol is preferable, and ethylene glycol monohexyl ether, diethylene glycol monohexyl ether (hexyl diglycol), diethylene glycol mono-2-ethylhexyl ether, or 1,2-octanediol is more preferable as the organic solvent used in the present disclosure.

<Resin Particles>

The ink according to the present disclosure contains resin particles.

[Structural Unit c1]

The resin particles used in the present disclosure contain a resin having 1% by mass to 20% by mass of a structural unit represented by Formula 3 (hereinafter, referred to as "structural unit c1") with respect to the total mass of the resin.

In the present disclosure, the resin particles contain a resin and may contain a core agent or the like other than the resin, but it is preferable that the resin particles consist of only the resin.

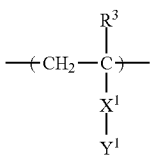
(3)

In Formula 3, $R^3$ represents a hydrogen atom or an alkyl group having 1 to 4 carbon atoms, $X^1$ represents a divalent linking group, $Y^1$ represents an anionic group, and an atom included in $X^1$ or $Y^1$ and farthest from a main chain is separated from the main chain by a distance of 4 atoms to 27 atoms. In a case where the distance between the main chain and the atom farthest from the main chain is 4 atoms or more from the main chain, the hydrophobicity of the structural unit c1 increases, and thus the hydrophobicity of the entirety of the resin particles increases. In this manner, after the ink droplets land on the recording medium, the resin particles contained in the ink droplets are easily fixed on the recording medium, and the landing interference is suppressed. Therefore, it is considered that an image with excellent graininess can be obtained by using the ink of the present disclosure. Further, it is considered that since the hydrophobicity of the entirety of the resin particles is high, the resin particles are unlikely to swell, and the ink according to the present disclosure has excellent jettability. Meanwhile, it is considered that in a case where the distance between the main chain and the atom farthest from the main chain is 27 atoms or less from the main chain, the hydrophobicity of the entirety of the resin particles is not extremely high, and the jettability is excellent. Further, from the viewpoints of availability of raw materials and manufacturing suitability, the distance between the main chain and the atom farthest from the main chain between $X^1$ and $Y^1$ is preferably 27 atoms or less from the main chain.

In Formula 3, it is preferable that $R^3$ represents a hydrogen atom or a methyl group.

In Formula 3, $X^1$ represents preferably a group selected from the group consisting of —C(=O)O—, —C(=O)NR$^4$—, an alkylene group, and an arylene group or a divalent group obtained by combining two or more selected from these groups and more preferably a group selected from the group consisting of —C(=O)O—, —C(=O)NR$^4$—, an alkylene group having 6 to 22 carbon atoms, and an arylene group having 6 to 20 carbon atoms or a divalent group obtained by combining two or more selected from these groups.

In a case where $X^1$ represents —C(=O)O— or —C(=O)NR$^4$—, it is preferable that the carbon atom to which $R^3$ in Formula 3 is bonded and the carbon atom in —C(=O)O— or —C(=O)NR$^4$— (excluding the carbon atom contained in $R^4$) are directly bonded to each other.

$R^4$ represents a hydrogen atom or an alkyl group having 1 to 4 carbon atoms, preferably a hydrogen atom or a methyl group, and more preferably a hydrogen atom.

In Formula 3, $Y^1$ represents preferably —C(=O)OM, —S(=O)$_2$OM, or —OP(=O)(OM)$_2$ and more preferably —C(=O)OM.

M represents a hydrogen atom, an alkali metal, or quaternary ammonium. M may be bonded or dissociated. From the viewpoint of dispersion stability of the resin particles in the ink, it is preferable that M represents an alkali metal. Examples of the alkali metal include sodium and potassium. The resin particles in which M represents an alkali metal are obtained by substituting the hydrogen atom using a hydrogen carbonate of an alkali metal, a carbonate of an alkali metal, sodium hydroxide, potassium hydroxide, or the like, for example, in a step of synthesizing the resin particles using a monomer in which $Y^1$ represents —C(=O)OH.

In Formula 3, from the viewpoint of improving the jettability of the ink and obtaining an image with more excellent graininess, the atom included in $X^1$ or $Y^1$ and farthest from a main chain is separated from the main chain by a distance of preferably in a range of 10 atoms to 23 atoms and more preferably in a range of 12 atoms to 20 atoms from the main chain.

The structural unit c1 is preferably a structural unit represented by Formula 4 or 5 and more preferably a structural unit represented by Formula 4.

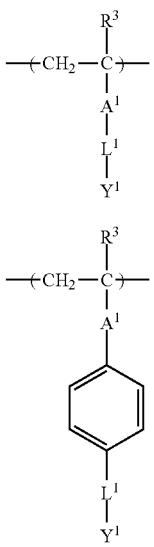

(4)

(5)

In Formula 4 or 5, $R^3$'s each independently represent a hydrogen atom or an alkyl group having 1 to 4 carbon atoms, $A^1$'s each independently represent a single bond, —C(=O)O—, or —C(=O)NR$^4$—, $R^4$ represents a hydrogen atom or an alkyl group having 1 to 4 carbon atoms, $L^1$'s each independently represent a divalent linking group having 6 to 22 carbon atoms, $Y^1$ represents an anionic group, and the atom farthest from the main chain between $L^1$ and $Y^1$ is separated by a distance of 4 atoms to 27 atoms from the main chain.

In Formula 4 or 5, $R^3$ has the same definition as that for $R^3$ in Formula 3, and the preferable aspects thereof are the same as described above.

In Formula 4, it is preferable that $A^1$ represents —C(=O)O— or —C(=O)NR$^4$—. In Formula 5, it is preferable that $A^1$ represents a single bond.

In Formula 4 or 5, the direction of the bond of —C(=O)O— or —C(=O)NR$^4$— is not particularly limited, but it is preferable that the carbon atoms in —C(=O)O— or —C(=O)NR$^4$— and the carbon atom to which $R^3$ in Formula 4 or 5 is bonded are directly bonded to each other.

$R^4$ represents preferably a hydrogen atom or a methyl group and more preferably a hydrogen atom.

In Formula 4, it is preferable that $L^1$ represents an alkylene group having 6 to 22 carbon atoms. The alkylene group may be linear or branched, but it is preferable that the alkylene group is linear from the viewpoint of the jettability of the ink. $L^1$ represents preferably an alkylene group having 8 to 22 carbon atoms, more preferably an alkylene group having 8 to 16 carbon atoms, and still more preferably an alkylene group having 10 to 12 carbon atoms.

In Formula 5, it is preferable that $L^1$ represents a divalent linking group having 6 to 20 carbon atoms. The divalent linking group is not particularly limited, but from the viewpoint of synthetic suitability, —C(=O)NR$^4$—(CH$_2$)$_n$— or —C(=O)O—(CH$_2$)$_n$— is preferable, and —C(=O)NR$^4$—(CH$_2$)$_n$— is more preferable. $R^4$ represents a hydrogen atom or an alkyl group having 1 to 4 carbon atoms, preferably a hydrogen atom or a methyl group, and more preferably a hydrogen atom. Further, n represents an integer of 5 to 18, more preferably 7 to 15, and still more preferably 10 to 12.

In Formula 4 or 5, $Y^1$'s each independently represent preferably —C(=O)OM, —S(=O)$_2$OM, or —OP(=O)(OM)$_2$ and more preferably —C(=O)OM.

M represents a hydrogen atom, an alkali metal, or quaternary ammonium. M may be bonded or dissociated. From the viewpoint of dispersion stability of the resin particles in the ink, it is preferable that M represents an alkali metal. Examples of the alkali metal include sodium and potassium.

In Formula 4 or 5, from the viewpoint of improving the jettability of the ink and obtaining an image with more excellent graininess, the atom farthest from the main chain between $L^1$ and $Y^1$ is separated by a distance of preferably 10 atoms to 23 atoms more preferably 12 atoms to 20 atoms from the main chain.

Hereinafter, preferred specific examples of the structural unit c1 are shown, but the structural unit c1 is not limited to such specific examples. In the specific examples, n represents the repetition number, and R represents a hydrogen atom or an alkyl group having 1 to 4 carbon atoms.

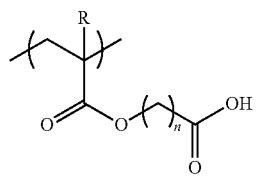

n = 6~22

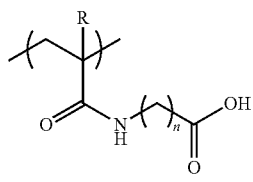

n = 6~22

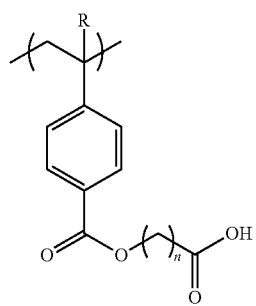

n = 5~18

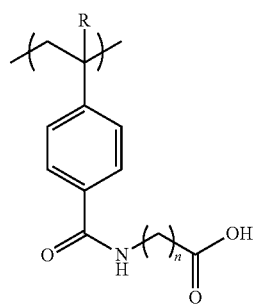

n = 5~18

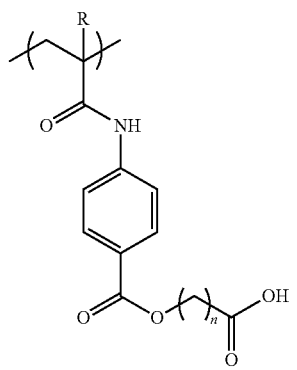

n = 5~16

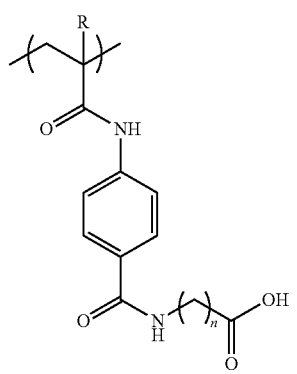

n = 5~16

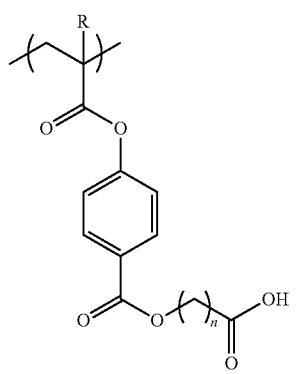

n = 5~16

-continued

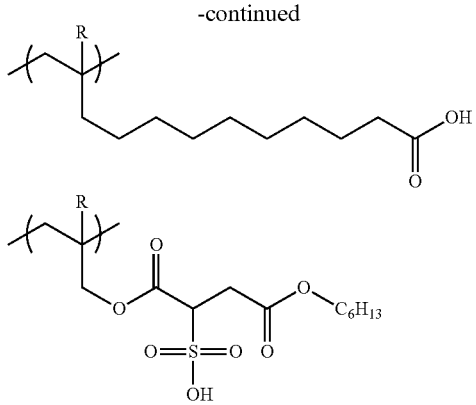

The content of the structural unit c1 is in a range of 1% by mass to 20% by mass with respect to the total mass of the resin. From the viewpoint of the jettability of the ink, the content thereof is preferably in a range of 1.5% by mass to 18% by mass and more preferably in a range of 2% by mass to 12% by mass.

In the present disclosure, the resin may contain only one or two or more kinds of structural units c1. In a case where the resin contains two or more kinds of structural units c1, the above-described content denotes the total content of two or more kinds of structural units c1.

The structural unit c1 is a structural unit derived from a monomer containing an anionic group and is highly hydrophobic due to a relatively long side chain. The hydrophobicity of the entirety of resin particles increases as the hydrophobicity of the structural unit derived from an anionic group-containing monomer increases. In this manner, after the ink droplets land on the recording medium, the resin particles contained in the ink droplets are easily fixed on the recording medium, and the landing interference is suppressed. Therefore, it is considered that an image with excellent graininess can be obtained by using the ink of the present disclosure. Further, it is considered that since the hydrophobicity of the entirety of the resin particles is high, the resin particles are unlikely to swell, and the ink according to the present disclosure has excellent jettability.

In the present disclosure, the content of the structural unit c1 is in a range of 1% by mass to 20% by mass with respect to the total mass of the resin, but the kind of structural unit other than the structural unit c1 is not particularly limited. In general, the physical properties of the entire resin are considered to be changed depending on the kind of each structural unit constituting the resin. However, the present inventors found that the jettability of the ink is improved and an image with excellent graininess is obtained as described above because the structural unit derived from a monomer containing an anionic group is the structural unit c1.

[Structural Unit c2]

It is preferable that the resin further contains a structural unit c2 derived from an ethylenically unsaturated compound having an aromatic ring structure or an alicyclic structure (hereinafter, also simply referred to as "structural unit c2") as a structural unit other than the structural unit c1.

Examples of the ring contained in the structural unit c2 include a benzene ring, a naphthalene ring, an anthracene ring, and an aliphatic hydrocarbon ring having 5 to 20 carbon atoms. Among these, a benzene ring or an aliphatic hydrocarbon ring having 6 to 10 carbon atoms is preferable as the ring contained in the structural unit c2. These rings may have substituents on the rings.

The ethylenically unsaturated compound having an aromatic ring structure or an alicyclic structure is preferably an ethylenically unsaturated compound containing an ethylenically unsaturated group at the terminal of the compound, more preferably styrene, styrene having a substituent, a (meth)acrylate compound, or a (meth)acrylamide compound, and still more preferably styrene, styrene having a substituent, or a (meth)acrylate compound.

From the viewpoint of improving the rub resistance of the image to be obtained, it is preferable that the structural unit c2 is at least one selected from the group consisting of structural units represented by Formulae A to F. Further, from the viewpoint of further improving the jettability of the ink, it is more preferable that the structural unit c2 includes a structural unit represented by Formula A.

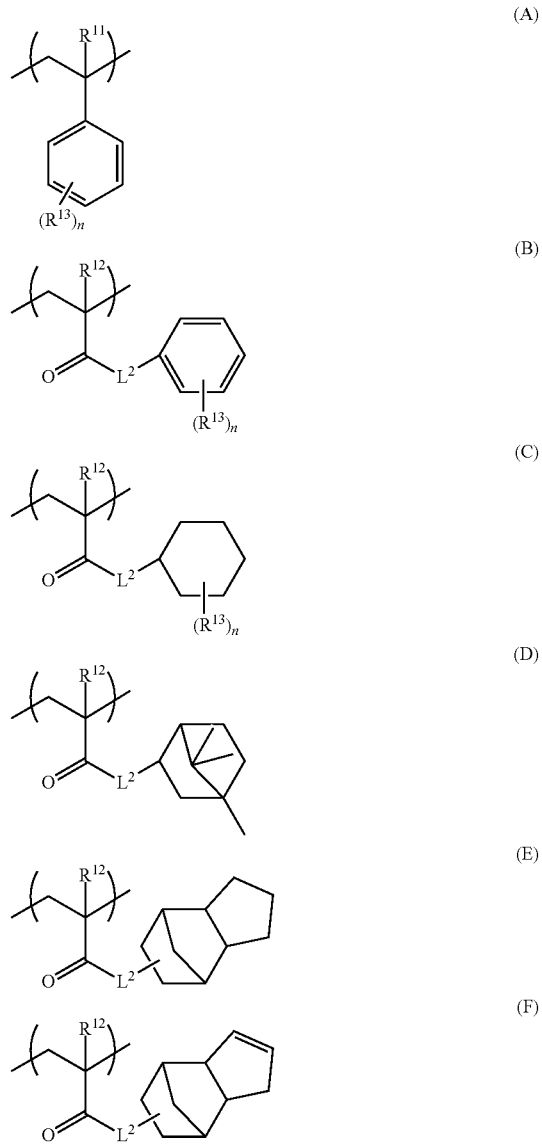

In Formulae A to F, $R^{11}$ and $R^{12}$ each independently represent a hydrogen atom or a methyl group. $R^{13}$'s each independently represent a linear or branched alkyl group having 1 to 10 carbon atoms. n's each independently represent an integer of 0 to 5. $L^2$'s each independently represent a divalent group selected from the group consisting of an alkylene group having 1 to 18 carbon atoms, an arylene group having 6 to 18 carbon atoms, —O—, —NH—, —S—, and —C(=O)—, a divalent group formed by combining two or more groups selected from these groups, or a single bond.

In Formula A, it is preferable that $R^{11}$ represents a hydrogen atom.

In Formulae B to F, it is preferable that $R^{12}$ represents a methyl group.

In Formulae A to C, $R^{13}$s each independently represent preferably a linear or branched alkyl group having 1 to 4 carbon atoms and more preferably a methyl group or an ethyl group.

In Formulae A to C, n represents preferably an integer of 0 to 2, more preferably 0 or 1, and still more preferably 0.

In Formula B, $L^2$ represents preferably a divalent linking group containing at least —O— or —NH— at the bonding site between the carbonyl group described in Formula B and the carbon atom bonded thereto, more preferably a divalent linking group containing at least —O— or —NH— and containing a linear or branched alkylene group that has 1 to 18 carbon atoms and may have a ring structure at the bonding site between the carbonyl group and the carbon atom bonded thereto, still more preferably —OCH$_2$— or —NHCH$_2$—, and particularly preferably —OCH$_2$—.

In Formulae C to E, $L^2$ represents preferably a divalent linking group containing at least —O— or —NH— at the bonding site between the carbonyl group described in Formulae C to F and the carbon atom bonded thereto, more preferably —O— or —NH—, and still more preferably —O—.

Hereinafter, specific examples of the structural unit represented by Formula A will be shown, but the structural unit represented by Formula A is not limited to the following specific examples.

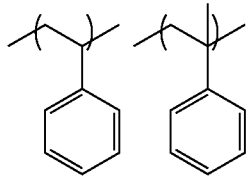

Hereinafter, specific examples of the structural unit represented by Formula B will be shown, but the structural unit represented by Formula B is not limited to the following specific examples.

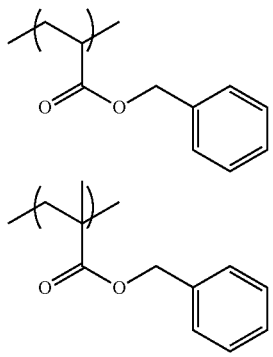

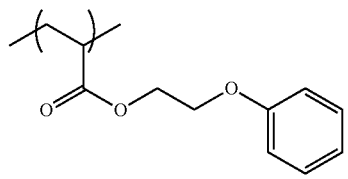

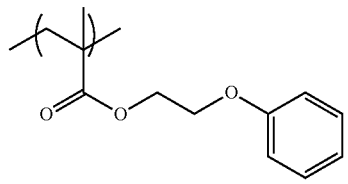

Hereinafter, specific examples of the structural unit represented by Formula C will be shown, but the structural unit represented by Formula C is not limited to the following specific examples.

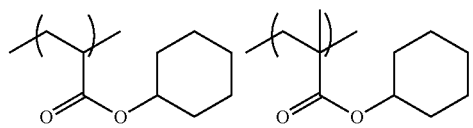

Hereinafter, specific examples of the structural unit represented by Formula D will be shown, but the structural unit represented by Formula D is not limited to the following specific examples.

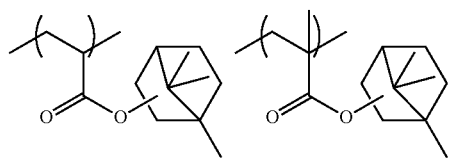

Hereinafter, specific examples of the structural unit represented by Formula E will be shown, but the structural unit represented by Formula E is not limited to the following specific examples.

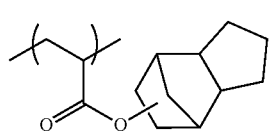

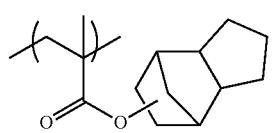

Hereinafter, specific examples of the structural unit represented by Formula F will be shown, but the structural unit represented by Formula F is not limited to the following specific examples.

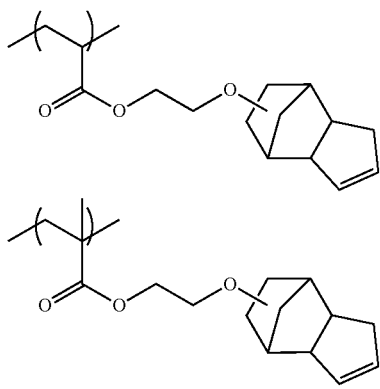

From the viewpoint of improving the jettability of the ink, the content of the structural unit c2 is preferably in a range of 5% by mass to 90% by mass and more preferably in a range of 10% by mass to 50% by mass with respect to the total mass of the resin.

The resin may have only one or two or more kinds of structural units c2. In a case where the resin has two or more kinds of structural units c2, the above-described content denotes the total content of two or more kinds of structural units c2.

[Other Structural Units c3]

The resin may have other structural units c3 (hereinafter, also simply referred to as "structural unit c3") in addition to the structural unit c1 and the structural unit c2.

The structural unit c3 is not particularly limited, but is preferably a structural unit derived from a (meth)acrylamide compound or a (meth)acrylate compound and more preferably a structural unit derived from a (meth)acrylate compound. Further, it is preferable that the structural unit c3 does not contain an anionic group.

It is preferable that the structural unit c3 is a structural unit derived from an alkyl (meth)acrylate compound containing an alkyl group with 1 to 10 carbon atoms. The alkyl group may be linear or branched and may have a cyclic structure.

The resin may or may not have the structural unit c3. In a case where the resin has the structural unit c3, from the viewpoint of improving the jettability of the ink, the content of the structural unit c3 is preferably in a range of 10% by mass to 90% by mass, more preferably in a range of 30% by mass to 85% by mass, and still more preferably in a range of 50% by mass to 80% by mass with respect to the total mass of the resin.

The resin may have only one or two or more kinds of structural units c3. In a case where the resin has two or more kinds of structural units c3, the above-described content denotes the total content of two or more kinds of structural units c3.

[Characteristics of Resin Particles]

From the viewpoint of dispersibility of the resin particles, the content of the anionic group in the resin of the resin particles is preferably in a range of 0.05 mmol/g to 0.7 mmol/g and more preferably in a range of 0.1 mmol/g to 0.4 mmol/g with respect to the total mass of the resin.

The weight-average molecular weight (Mw) of the resin is preferably in a range of 10000 to 1000000 and more preferably in a range of 20000 to 500000.

In the present disclosure, the weight-average molecular weight (Mw) indicates a value measured according to gel permeation chromatography (GPC) unless otherwise specified. The measurement according to gel permeation chromatography (GPC) is performed using HLC (registered trademark)-8020GPC (manufactured by Tosoh Corporation) as a measuring device, three columns of TSKgel (registered trademark), Super Multipore, HZ-H (manufactured by Tosoh Corporation, 4.6 mmID×15 cm), and tetrahydrofuran (THF) as an eluent. Further, the measurement is performed under measurement conditions of a sample concentration of 0.45% by mass, a flow rate of 0.35 ml/min, a sample injection volume of 10 μL, and a measurement temperature of 40° C. using an RI detector. Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

From the viewpoint of improving the rub resistance of the image, the glass transition temperature (Tg) of the resin is preferably in a range of 30° C. to 120° C., more preferably in a range of 50° C. to 100° C., and still more preferably in a range of 70° C. to 100° C.

A measured Tg obtained by actual measurement is employed as the glass transition temperature (Tg). The measured Tg is measured under typical measurement conditions using a differential scanning calorimeter, for example, a differential scanning calorimeter (product name, "EXSTAR 6220", manufactured by SII Nanotechnology Inc.). However, a calculated Tg calculated by the following calculation formula is employed in a case where it is difficult to perform measurement due to decomposition or the like of the material. The calculated Tg is a value calculated by Equation 1.

$$1/Tg = \Sigma(Xi/Tgi) \qquad (1)$$

Here, it is assumed that the polymer as a target for calculation is formed by copolymerizing n kinds of monomer components (i represents 1 to n). Xi represents a mass fraction ($\Sigma Xi=1$) of the i-th monomer and Tgi represents a glass transition temperature (absolute temperature) of a homopolymer of the i-th monomer. Here, $\Sigma$ is obtained by summing 1 to n as i. Further, values in Polymer Handbook (3rd Edition) (written by J. Brandrup, E. H Immergut (Wiley-Interscience, 1989)) are employed as the value (Tgi) of the glass transition temperature of the homopolymer of each monomer.

From the viewpoint of the jettability of the ink, the volume average particle diameter of the resin particles is preferably in a range of 1 nm to 200 nm, more preferably in a range of 5 nm to 100 nm, and still more preferably in a range of 10 nm to 50 nm.

The volume average particle diameter is measured by a particle size distribution measuring device using light scattering, for example, a particle size distribution measuring device (product name, "MICROTRAC UPA (registered trademark) EX150", manufactured by NIKKISO CO., LTD.).

[Method of Producing Resin Particles]

A method of producing the resin particles is not particularly limited, but it is preferable that the resin particles are prepared by an emulsion polymerization method. The emulsion polymerization method is a method of polymerizing an emulsion prepared by adding a monomer, a polymerization initiator, an emulsifier, and an additive such as a chain transfer agent as necessary to an aqueous medium (for example, water). In a case where the emulsion polymerization method is applied to the preparation of the resin particles, the monomer forming the structural unit c1 also functions as an emulsifier. Therefore, it is not necessary to separately add an emulsifier other than the monomer forming the structural unit c1, but a known emulsifier may be added separately unless the jettability of the ink and the image quality are degraded.

The polymerization initiator used for the method of producing the resin particles is not particularly limited, and examples thereof include an inorganic persulfate (such as potassium persulfate, sodium persulfate, or ammonium persulfate), an azo-based initiator (such as 2,2'-azobis(2-amidinopropane)dihydrochloride or 2,2'-azobis[2-methyl-N-(2-hydroxyethyl)-propionamide]), an organic peroxide (such as t-butyl peroxypivalate or t-butyl hydroperoxide), and salts thereof. The polymerization initiator may be used alone or in combination of two or more kinds thereof. Among these, an azo-based initiator or an organic peroxide is preferable as the polymerization initiator.

The amount of the polymerization initiator to be used is preferably in a range of 0.01% by mass to 2% by mass and more preferably in a range of 0.2% by mass to 1% by mass with respect to the total mass of the monomer.

Examples of the chain transfer agent used for the method of producing the resin particles include known compounds such as carbon tetrahalide, dimers of styrenes, dimers of (meth)acrylic acid esters, mercaptans, and sulfides. Among these, dimers of styrenes or mercaptans described in JP1993-17510A (JP-H5-17510A) are preferable as the chain transfer agent.

It is preferable that the resin particles are dispersed in the ink.

Further, it is preferable that the resin particles are self-dispersing resin particles. The self-dispersing resin particles are resin particles consisting of a water-insoluble resin that can enter a dispersed state in an aqueous medium due to a functional group (such as an anionic group) of the resin itself in a case where the resin particles enter a dispersed state using a phase-transfer emulsification method in the absence of a surfactant.

Here, the concept of the dispersed state includes both an emulsified state (emulsion) in which a water-insoluble resin is dispersed in an aqueous medium in a liquid state and a dispersed state (suspension) in which a water-insoluble resin is dispersed in the aqueous medium in a solid state.

Further, the term "water-insoluble" denotes that the amount of a substance to be dissolved in 100 parts by mass of water at 25° C. is 5.0 parts by mass or less.

The resin particles used in the present disclosure do not function as a dispersant of a pigment. Further, the resin particles used in the present disclosure are present in the form of particles in the ink. Therefore, the resin particles are distinguished from the dispersant used in the present disclosure.

From the viewpoints of the storage stability of the ink and the rub resistance of the image to be obtained, the content of the resin particles is preferably in a range of 0.5% by mass to 20% by mass, more preferably in a range of 1% by mass to 10% by mass, and still more preferably in a range of 1.5% by mass to 8% by mass with respect to the total mass of the ink.

Specific examples of the resin contained in the resin particles used in the present disclosure are shown below, but the present disclosure is not limited thereto. In the following specific examples, n represents the repetition number, and the unit of % by mass denotes the content of each structural unit. It is preferable that the resin particles used in the present disclosure are resin particles consisting of resins shown in the following specific examples. Further, in all the following specific examples, the anionic groups are described to be in a state of an acid, but a part or the entirety of the acid may be a salt.

| | Structural unit c1 | Structral unit c2 | Structural unit c3 | Mw (10000) | Tg (° C.) |
|---|---|---|---|---|---|
| C-1 | [acrylamide derivative with -NH-(CH$_2$)$_n$-COOH, n = 10] 7% by mass | [styrene unit] 30% by mass | [methyl methacrylate unit] 63% by mass | 25 | 96 |
| C-2 | [carboxylic acid unit with (CH$_2$)$_n$-OH, n = 7] 7% by mass | [styrene unit] 30% by mass | [methyl methacrylate unit] 63% by mass | 26 | 94 |

| | Monomer 1 | Monomer 2 | Monomer 3 | | |
|---|---|---|---|---|---|
| C-3 | 4-(carboxynonylcarbamoyl)styrene derivative, n=9, 7% by mass | styrene, 30% by mass | methyl acrylate, 63% by mass | 28 | 96 |
| C-4 | sulfosuccinate diester with C6H13, 7% by mass | styrene, 30% by mass | methyl acrylate, 63% by mass | 22 | 95 |
| C-5 | methacrylamide-(CH2)n-COOH, n=10, 1% by mass | styrene, 30% by mass | methyl acrylate, 69% by mass | 27 | 103 |
| C-6 | methacrylamide-(CH2)n-COOH, n=10, 3% by mass | styrene, 30% by mass | methyl acrylate, 67% by mass | 22 | 101 |
| C-7 | methacrylamide-(CH2)n-COOH, n=10, 10% by mass | styrene, 30% by mass | methyl acrylate, 60% by mass | 21 | 94 |
| C-8 | methacrylamide-(CH2)n-COOH, n=10, 15% by mass | styrene, 30% by mass | methyl acrylate, 56% by mass | 24 | 89 |
| C-9 | methacrylamide-(CH2)n-COOH, n=10, 20% by mass | styrene, 30% by mass | methyl acrylate, 50% by mass | 28 | 84 |

-continued
| | | | | | |
|---|---|---|---|---|---|
| C-10 | 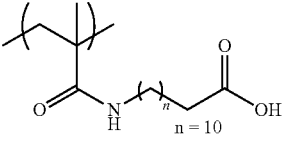 7% by mass | 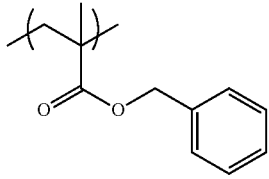 30% by mass | 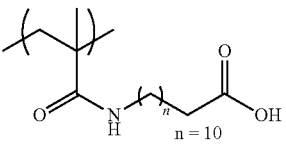 63% by mass | 30 | 83 |
| C-11 | 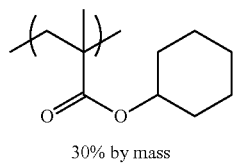 7% by mass | 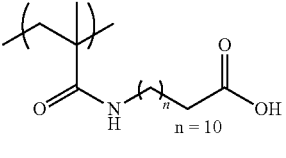 30% by mass | 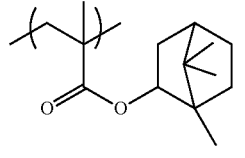 63% by mass | 22 | 78 |
| C-12 | 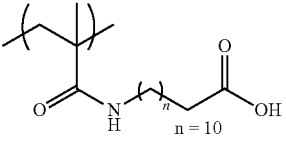 7% by mass | 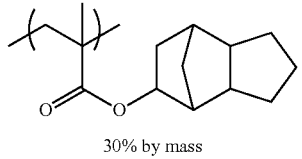 30% by mass | 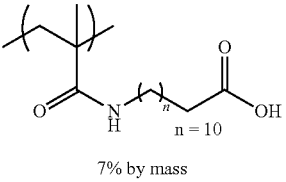 63% by mass | 25 | 115 |
| C-13 | 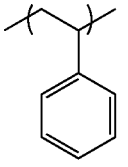 7% by mass | 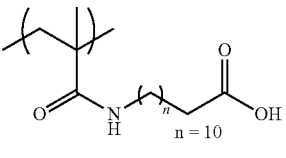 30% by mass | 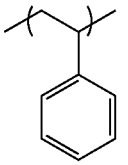 63% by mass | 20 | 118 |
| C-14 | 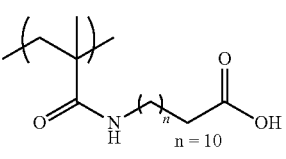 7% by mass | 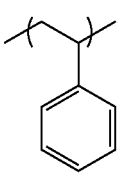 5% by mass | 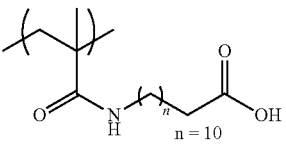 88% by mass | 28 | 98 |
| C-15 | 7% by mass | 10% by mass | 83% by mass | 20 | 98 |
| C-16 | 7% by mass | 50% by mass | 43% by mass | 15 | 95 |

-continued

| | Structural unit c1 | Structural unit c2 | Structural unit c3 | | |
|---|---|---|---|---|---|
| C-17 | acrylamide-(CH₂)ₙ-COOH, n=10, 7% by mass | styrene, 90% by mass | methyl acrylate, 3% by mass | 18 | 93 |
| C-18 | acrylamide-(CH₂)ₙ-COOH, n=10, 7% by mass | styrene, 30% by mass | 2-ethylhexyl acrylate, 63% by mass | 23 | 24 |
| C-19 | acrylamide-(CH₂)ₙ-COOH, n=10, 7% by mass | styrene, 46% by mass | 2-ethylhexyl acrylate, 47% by mass | 25 | 42 |
| C-20 | acrylamide-(CH₂)ₙ-COOH, n=10, 7% by mass | styrene, 63% by mass | 2-ethylhexyl acrylate, 30% by mass | 28 | 60 |
| C-21 | acrylamide-(CH₂)ₙ-COOH, n=10, 7% by mass | styrene, 30% by mass | butyl acrylate, 63% by mass | 15 | −4 |
| C-22 | acrylamide-(CH₂)ₙ-COOH, n=10, 15% by mass | styrene, 85% by mass | — | 23 | 86 |

| | Structural unit c1 | Structural unit c2 | | | |
|---|---|---|---|---|---|
| C-23 | acrylate-O-(CH₂)ₙ-COOH, n=10, 7% by mass | styrene, 30% by mass | — | | |

-continued
C-24 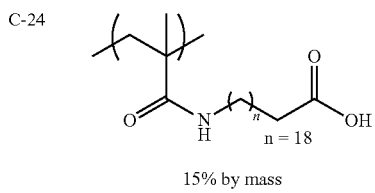 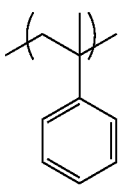
n = 18
15% by mass
30% by mass
C-25 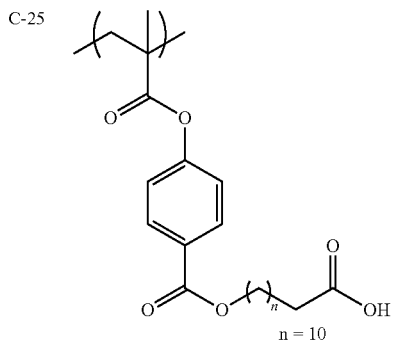 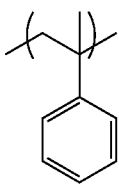
n = 10
15% by mass
30% by mass
C-26 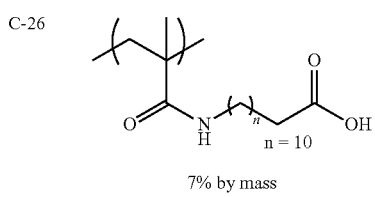 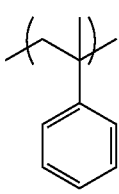
n = 10
7% by mass
35% by mass
C-27 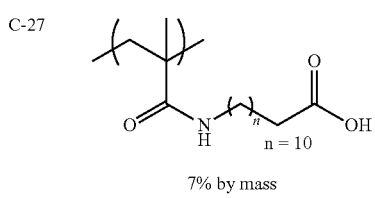 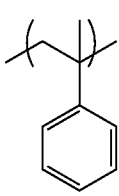 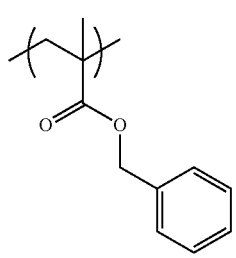
n = 10
7% by mass
5% by mass
30% by mass
C-28 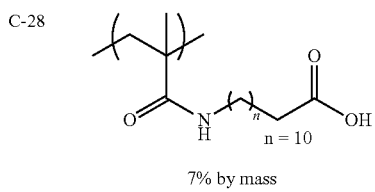 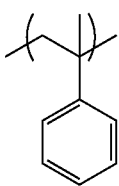 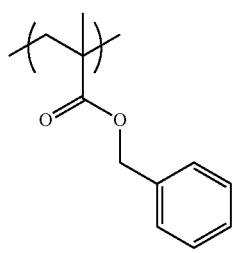
n = 10
7% by mass
5% by mass
30% by mass -continued
| | | | |
|---|---|---|---|
| C-29 | 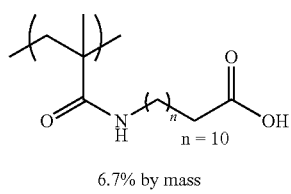 6.7% by mass | 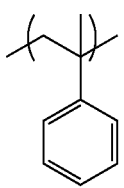 14% by mass | 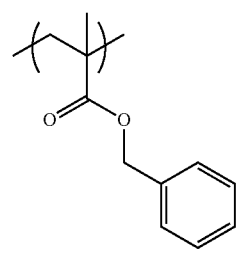 14% by mass |
| C-30 | 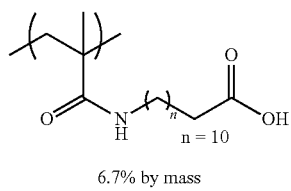 6.7% by mass | 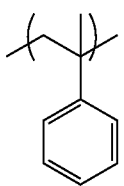 14% by mass | 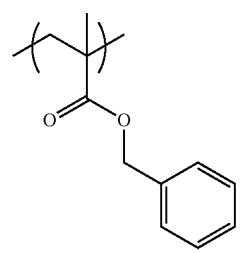 14% by mass |
Structural unit c3
| | | | |
|---|---|---|---|
| C-23 | 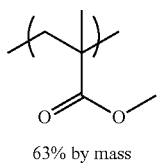 63% by mass | — | — |
| C-24 | 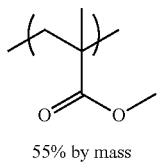 55% by mass | — | — |
| C-25 | 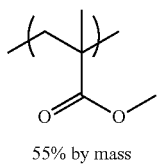 55% by mass | — | — |
| C-26 | 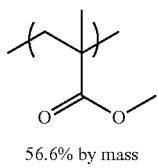 56.6% by mass | 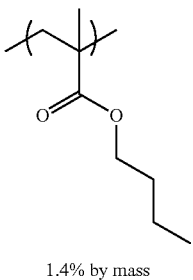 1.4% by mass | — |

-continued

C-27 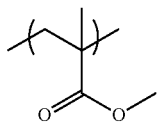
56.6% by mass

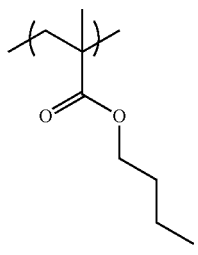
1.4% by mass

C-28 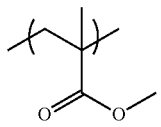
46.2% by mass

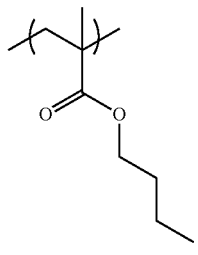
1.4% by mass

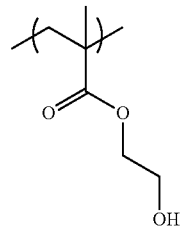
14% by mass

C-29 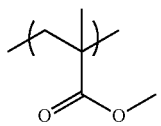
48% by mass

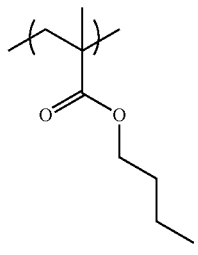
3.3% by mass

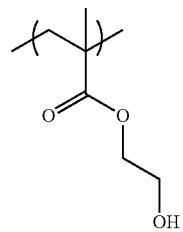
14% by mass

C-30 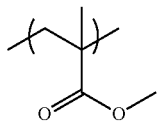
30% by mass

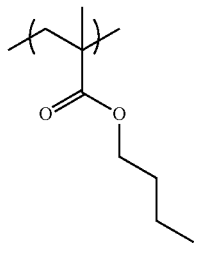
3.3% by mass

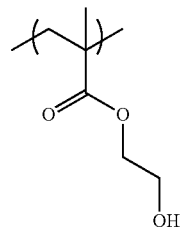
32% by mass

<Dispersant>

The ink according to the present disclosure contains at least one dispersant. In the present disclosure, the dispersant has a function of dispersing the pigment. The dispersant is adsorbed on the surface of the pigment and covers at least a part of the surface of the pigment, and thus the pigment can be dispersed in water.

From the viewpoint of the dispersion stability of the ink, it is preferable that the dispersant is a polymer. The structure of the dispersant is not particularly limited and may be any of a random polymer, a block polymer, or a graft polymer. Further, the dispersant may be a polymer having a crosslinked structure. Among examples of the dispersant, from the viewpoint of improving the jettability of the ink, a dispersant having a crosslinked structure is preferable, and a polymer having a crosslinked structure (hereinafter, also referred to as "crosslinked polymer") is more preferable as the dispersant.

The dispersant is considered to be present in the ink in a state where a part of the dispersant is adsorbed on the surface of the pigment and a part thereof is desorbed from the surface of the pigment. In a case where the dispersant has a crosslinked structure, the dispersant is unlikely to be desorbed from the surface of the pigment, and thus the jettability of the ink is considered to be improved.

It is possible to determine whether the dispersant is crosslinked, using the following method or the like.

The structure of the dispersant and the content ratio of monomers constituting the dispersant are specified by centrifuging the ink at a rotation speed of 10,000 rpm for 30 minutes, extracting the precipitated pigment dispersion with an organic solvent having a high polarity, and analyzing components using spectroscopy or a nuclear magnetic resonance (NMR) method. The organic solvent having a high polarity which is used here is appropriately selected according to the kind of polymer for the purpose of extraction.

The crosslinked polymer is formed, for example, by crosslinking an uncrosslinked polymer with a crosslinking agent. It is preferable that the uncrosslinked polymer is a water-soluble polymer.

In the present disclosure, the term "water-soluble" in "water-soluble polymer" denotes a property that 2% by mass or greater of a substance is dissolved in distilled water at 25° C. The amount of the water-soluble resin to be dissolved in distilled water at 25° C. is preferably 5% by mass or greater and more preferably 10% by mass or greater.

Examples of the uncrosslinked polymer include polyvinyl, polyurethane, and polyester. Among these, polyvinyl is preferable as the uncrosslinked polymer.

It is preferable that the uncrosslinked polymer is a polymer containing a functional group that can be crosslinked by a crosslinking agent. Examples of the crosslinkable functional group include a carboxy group or a salt thereof, an isocyanate group, and an epoxy group. Among these, from the viewpoint of improving the dispersibility of the pigment, a carboxy group or a salt thereof is preferable, and a carboxy group is particularly preferable as the crosslinkable functional group.

It is preferable that the polymer containing a carboxy group is a copolymer having a structural unit derived from a monomer containing a carboxy group (hereinafter, referred to as "carboxy group-containing monomer"). The structural unit derived from a carboxy group-containing monomer contained in a copolymer may be used alone or two or more kinds thereof. The copolymer may be a random copolymer or a block copolymer.

Examples of the carboxy group-containing monomer include (meth)acrylic acid, β-carboxyethyl acrylate, fumaric acid, itaconic acid, maleic acid, and crotonic acid.

From the viewpoints of the crosslinking properties and the dispersibility, (meth)acrylic acid or β-carboxyethyl acrylate is preferable, and (meth)acrylic acid is more preferable as the carboxy group-containing monomer.

It is preferable that the copolymer has a structural unit derived from a hydrophobic monomer in addition to the structural unit derived from a carboxy group-containing monomer. The structural unit derived from a hydrophobic monomer contained in the copolymer may be used alone or two or more kinds thereof.

Examples of the hydrophobic monomer include a (meth)acrylate containing an alkyl group with 1 to 20 carbon atoms and a (meth)acrylate having an aromatic ring.

The polymer containing a carboxy group is preferably a copolymer having a structural unit derived from a carboxy group-containing monomer and at least one selected from the group consisting of a structural unit derived from a (meth)acrylate containing an alkyl group with 1 to 20 carbon atoms and a structural unit derived from a (meth)acrylate having an aromatic ring, more preferably a copolymer having a structural unit derived from (meth)acrylic acid and a structural unit derived from a (meth)acrylate having an aromatic ring, and particularly preferably a copolymer having a structural unit derived from (meth)acrylic acid and a structural unit derived from benzyl (meth)acrylate.

From the viewpoint of the dispersibility of the pigment, the acid value of the uncrosslinked polymer is preferably in a range of 67 mgKOH/g to 200 mgKOH/g and more preferably in a range of 67 mgKOH/g to 150 mgKOH/g.

Further, from the viewpoint of the dispersibility of the pigment, the acid value of the crosslinked polymer is preferably in a range of 55 mgKOH/g to 100 mgKOH/g.

The weight-average molecular weight (Mw) of the uncrosslinked polymer is not particularly limited, but is preferably in a range of 3,000 to 100,000, more preferably in a range of 5,000 to 80,000, and still more preferably in a range of 10,000 to 60,000 from the viewpoint of the dispersibility of the pigment.

The preferable ranges of the weight-average molecular weight of the crosslinked polymer are the same as the preferable ranges of the weight-average molecular weight of the uncrosslinked polymer.

It is preferable that the crosslinking agent used in a case of crosslinking the uncrosslinked polymer is a compound having two or more reaction sites with the uncrosslinked polymer (for example, a polymer containing a carboxy group). The crosslinking agent may be used alone or in combination of two or more kinds thereof.

As a combination of the crosslinking agent and the uncrosslinked polymer, a combination of a compound containing two or more epoxy groups (that is, a bifunctional or higher functional epoxy compound) and a polymer containing a carboxy group is preferable. In this combination, a crosslinked structure is formed by the reaction between the epoxy group and the carboxy group. In this manner, a crosslinked polymer is formed. It is preferable that the crosslinked structure is formed by the crosslinking agent after the pigment is dispersed by the uncrosslinked polymer.

Examples of the bifunctional or higher functional epoxy compound include ethylene glycol diglycidyl ether, polyethylene glycol diglycidyl ether, 1,6-hexanediol diglycidyl ether, diethylene glycol diglycidyl ether, polyethylene glycol diglycidyl ether, dipropylene glycol diglycidyl ether, polypropylene glycol diglycidyl ether, and trimethylolpropane triglycidyl ether.

Among these, polyethylene glycol diglycidyl ether, diethylene glycol diglycidyl ether, or trimethylolpropane triglycidyl ether is preferable as the bifunctional or higher functional epoxy compound.

Commercially available products may be used as the crosslinking agent.

Examples of the commercially available products include Denacol EX-321, EX-821, EX-830, EX-850, and EX-851 (manufactured by Nagase ChemteX Corporation).

From the viewpoints of the crosslinking reaction rate and the dispersion stability after crosslinking, the molar ratio between a reaction site (for example, an epoxy group) in the crosslinking agent and a reaction site (for example, a carboxy group) in the uncrosslinked polymer is preferably in a range of 1:1.1 to 1:10, more preferably in a range of 1:1.1 to 1:5, and still more preferably in a range of 1:1.1 to 1:3.

The mixing ratio between the pigment and the dispersant is preferably in a range of 1:0.06 to 1:3, more preferably in a range of 1:0.125 to 1:2, and still more preferably in a range of 1:0.125 to 1:1.5 in terms of the mass.

<Silicone-Based Surfactant>

The ink according to the present disclosure contains at least one silicone-based surfactant. It is preferable that the silicone-based surfactant is a compound having a polysiloxane structure in a molecule. In a case where the ink contains the silicone-based surfactant, the jettability of the ink is improved. The reason for this is considered to be that the ink is unlikely to adhere to a nozzle from which the ink is jetted in a case where the ink contains the silicone-based surfactant.

Examples of the silicone-based surfactant include a compound in which an organic group is introduced to a part of dimethylpolysiloxane. An organic group is introduced to a side chain, one terminal, both terminals, or both a side chain and a terminal of dimethylpolysiloxane.

Examples of the dimethylpolysiloxane to which an organic group is introduced include modified silicone compounds such as amine-modified silicone, alcohol-modified silicone, polyether-modified silicone, and long-chain alkyl-modified silicone. Among these, from the viewpoint of improving the jettability of the ink, it is preferable that the silicone-based surfactant is a polyether-modified silicone.

In the present disclosure, it is preferable that the silicone-based surfactant is a compound having a molecular weight of 200 to 2000 and having a structure represented by Formula 4.

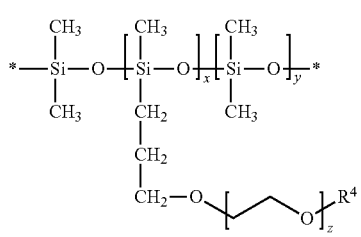
(4)

In Formula 4, $R^4$ represents a hydrogen atom or an alkyl group having 1 to 4 carbon atoms, and x, y, and z each independently represent an integer of 1 or greater. "*" represents a bonding position with respect to another structure in a molecule.

In Formula 4, it is preferable that $R^4$ represents a hydrogen atom or a methyl group.

The molecular weight of the silicone-based surfactant is in a range of 200 to 2000 and preferably in a range of 400 to 1800. Since the silicone-based surfactant having a molecular weight of 200 to 2000 is likely to be aligned at the interface, the jettability is improved.

The content of the silicone-based surfactant is preferably in a range of 0.03% by mass to 0.8% by mass, more preferably in a range of 0.04% by mass to 0.5% by mass, and still more preferably in a range of 0.05% by mass to 0.3% by mass with respect to the total mass of the ink.

<Other Components>

The ink according to the present disclosure may further contain known additives such as an ultraviolet absorbing agent, an antifading agent, a fungicide, a pH adjuster, a rust inhibitor, an antioxidant, an emulsion stabilizer, a preservative, an antifoaming agent, a viscosity adjuster, a dispersion stabilizer, a chelating agent, and a solid wetting agent.

(Preservative)

In the present disclosure, the preservative denotes an agent having a function of preventing generation and growth of microorganisms, particularly bacteria and fungi (mold).

The preservative may be any of an inorganic preservative or an organic preservative. Examples of the inorganic preservative include a compound having heavy metal ions, silver ions, and the like. Examples of the organic preservative include a quaternary ammonium salt (such as tetrabutylammonium chloride, cetylpyridinium chloride, or benzyltrimethylammonium chloride), a phenol derivative (such as phenol, cresol, butylphenol, xylenol, or bisphenol), a phenoxyether derivative (such as phenoxyethanol), a heterocyclic compound (such as benzotriazole, PROXEL, or 1,2-benzisothiazolin-3-one), alkanediols (such as pentylene glycol (1,2-pentanediol), isopentyldiol (such as 3-methyl-1,3-butanediol), hexanediol (such as 1,2-hexanediol), and caprylyl glycol (such as 1,2-octanediol)), acid amides, carbamic acid, carbamates, amidines and guanidines, pyridines (such as sodium pyridinethion-1-oxide), diazines, triazines, pyrroles and imidazoles, oxazoles and oxazines, thiazoles and thiadiazines, thioureas, thiosemicarbazides, dithiocarbamates, sulfides, sulfoxides, sulfones, sulfamides, antibiotics (penicillin and tetracycline), sodium dehydroacetate, sodium benzoate, p-hydroxybenzoic acid ethyl ester, and salts thereof.

Among these, it is preferable that the preservative is at least one selected from the group consisting of heterocyclic compounds, phenol derivatives, phenoxyether derivatives, and alkanediols. In addition, examples of preservatives include those described in Antibacterial and Antifungal Handbook (Gihodo Shuppan Co., Ltd., 1986) and Antibacterial and Antifungal Agent Encyclopedia (edited by Encyclopedia Editorial Committee of the Society for Antibacterial and Antifungal Agents, Japan).

It is preferable that the preservative is a water-soluble compound. The ink according to the present disclosure may contain only one or two or more kinds of preservatives.

In a case where two or more kinds of preservatives are used in combination, it is preferable that the two or more kinds of preservatives have skeletons with chemical structures different from each other. Further, in a case where the ink contains two or more kinds of preservatives, at least one preservative is preferably a heterocyclic compound, a phenol derivative, a phenoxyether derivative, or alkanediols and more preferably a heterocyclic compound. Particularly, a combination of a heterocyclic compound and a phenoxyether derivative, a combination of a heterocyclic compound and a phenol derivative, and a combination of a heterocyclic compound and alkanediols are preferable.

It is preferable that the heterocyclic compound is a thiazole-based compound or a benzotriazole-based compound. The thiazole-based compound particularly functions as a fungicide among preservatives. Examples of the thiazole-based compound include methylisothiazolinone, benzisothiazolin, isothiazolin, 1,2-benzisothiazolin-3-one, 5-chloro-2-methyl-4-isothiazolin-3-one, 2-(thiocyanomethylthio)benzthiazole, 2-mercaptobenzthiazole, and 3-allyloxy-1,2-benzisothiazol-1,1-oxide. Further, as the thiazole-based fungicide, Proxel (registered trademark) Series (BDN, BD20, GXL, LV, XL2), KORDEKMLX, ROCIMA 553, ROCIMA 552, PERMACHEM SK-50H, TOPSIDE 240, TOPSIDE 1000, and Ultra10 (manufactured by Arch Chemicals, Inc.).

The benzotriazole compound particularly functions as a rust inhibitor among preservatives. For example, the benzotriazole compound can suppress generation of rust due to contact between a metal material constituting an ink jet head (particularly alloy 42 (nickel-iron alloy containing 42% by mass nickel)) and the ink. Examples of the benzotriazole-based compound include 1H-benzotriazole, 4-methyl-1H-benzotriazole, 5-methyl-1H-benzotriazole, and sodium salts or potassium salts thereof.

The content ratio in a case where two or more kinds of preservatives are used in combination is not particularly limited, but the content of each preservative is preferably 1% by mass or greater, more preferably 10% by mass or greater, and still more preferably 20% by mass or greater with respect to the total content of the preservatives. Further, the content of each preservative is preferably 99% by mass or less, more preferably 90% by mass or less, and still more preferably 80% by mass or less with respect to the total content of the preservatives. The effects of each preservative can be efficiently obtained and the synergistic effects between the preservatives can also be easily obtained by setting the content thereof to be in the above-described ranges.

The content of the preservative (the total content in a case where the ink contains two or more kinds of preservatives) is preferably in a range of 0.001% by mass to 10% by mass, more preferably in a range of 0.005% by mass to 2.0% by mass, and still more preferably in a range of 0.01% to 0.5% by mass with respect to the total mass of the ink. The effects of the preservative can be efficiently obtained and generation of precipitates can be suppressed by setting the content thereof to be in the above-described ranges.

(Physical Properties of Ink)
[Dynamic Surface Tension]

It is preferable that the ink according to the present disclosure has a dynamic surface tension of 35 mN/m or less at 10 milliseconds (ms). The lower limit of the dynamic surface tension at 10 ms is not particularly limited, but is preferably 15 mN/m from the viewpoint of the storage stability of the ink.

In the present disclosure, the dynamic surface tension at 10 ms is measured by a maximum foaming pressure method in an environment of a temperature of 23° C. and a relative humidity of 55%. The dynamic surface tension at 10 ms is measured using, for example, a bubble pressure type dynamic surface tension meter (product name, "BP100", manufactured by KRUSS). The dynamic surface tension at 10 ms is a surface tension calculated from the maximum foam pressure in a case where the time from when bubbles are continuously jetted from the probe capillary tube inserted into the ink and a new interface is formed in the tip of the probe capillary tube (0 ms) to when the maximum foam pressure is obtained is 10 ms.

The dynamic surface tension of the ink jetted from the nozzle starts to decrease from the moment of being jetted and continuously decreases even after the ink lands on the recording medium to finally converge to the value of the static surface tension of the ink. The rate of decrease in dynamic surface tension is greatest immediately after jetting and gradually decreases as the time elapses after the jetting. Therefore, in a case where a certain ink droplet A lands on the recording medium and an ink droplet B subsequently lands on the recording medium, the dynamic surface tension of the ink droplet A is decreased further than the dynamic surface tension of the ink droplet B at the time point at which the ink droplet B lands on the recording medium. In a case where the dynamic surface tensions of the two ink droplets are different from each other, landing interference is likely to occur between the ink droplet A landed first and the ink droplet B landing later. Specifically, the image density is uneven due to attraction of the ink droplet A having a relatively low dynamic surface tension to the ink droplet B having a relatively high dynamic surface tension. In a case where the image density is uneven, the image gives an impression of being rough. That is, the graininess of the image is degraded.

The dynamic surface tension at 10 ms is a value closest to the dynamic surface tension at the moment of the ink droplets landing on the recording medium. In a case where the dynamic surface tension at 10 ms is 35 mN/m or less, ink droplets spread on the recording medium, and thus landing interference can be suppressed. An image in which the image density is unlikely to be uneven and the graininess is more excellent can be obtained.

[Viscosity]

The viscosity of the ink according to the present disclosure is preferably in a range of 1.2 mPa·s to 15.0 mPa·s, more preferably in a range of 2.0 mPa·s to 13.0 mPa·s, and still more preferably in a range of 2.5 mPa·s to 10.0 mPa·s.

The viscosity of the ink is measured at a temperature of 30° C. using a rotational viscometer, for example, "VISCOMETER TV-22" (product name, manufactured by Toki Sangyo Co., Ltd.).

[pH]

From the viewpoint of the storage stability of the ink, the pH of the ink according to the present disclosure is preferably in a range of 6.0 to 11.0, more preferably in a range of 7.0 to 10.0, and still more preferably in a range of 7.0 to 9.0.

The pH of the ink is measured at a temperature of 25° C. using a pH meter, for example, "WM-50EG" (product name, manufactured by DKK-TOA Corporation).

[Image Recording Method]

An image recording method according to the present disclosure includes a step of applying the ink according to the present disclosure to a recording medium using an ink jet recording method to record an image (hereinafter, also referred to as "ink applying step").

The image recording method according to the present disclosure may include other steps such as a step of drying water and the organic solvent contained in the ink applied onto the recording medium (hereinafter, also referred to as "ink drying step") and a step of melting and fixing the resin particles contained in the ink (hereinafter, also referred to as "heat-fixing step") as necessary.

It is preferable that the image recording method according to the present disclosure is a method of directly applying the ink according to the present disclosure onto a recording medium to record an image. That is, it is preferable that the image recording method according to the present disclosure is a so-called one-liquid system.

<Ink Applying Step>

The Ink applying step is a step of applying the ink according to the present disclosure onto a recording medium using an ink jet recording method to record an image.

The recording medium is not particularly limited, and examples thereof include coated paper used for general offset printing and the like. The coated paper is formed by coating a surface of high-quality paper, alkaline paper, or the like which mainly contains cellulose and has not been usually subjected to a surface treatment, with a coating material to provide a coating layer.

The coated paper is available as a commercially available product. Examples of the coated papers include "OK TOP COAT+" (manufactured by Oji Paper Co., Ltd.), coated paper (A2 and B2) such as "AURORA COAT" and "ULITE" (manufactured by Nippon Paper Industries Co., Ltd.), and art paper (A1) such as "TOKUBISHI ART" (manufactured by Mitsubishi Paper Mills Ltd.).

As the ink jet recording method, a commonly known method can be used, and examples thereof include an electric charge control method of jetting an ink using electrostatic attraction force, a drop-on-demand method (pressure pulse method) using a vibration pressure of a piezoelectric element, an acoustic ink jet method of jetting an ink using a radiation pressure by changing an electric signal into an acoustic beam and applying the acoustic beam to the ink, and a thermal ink jet method of heating an ink to form bubbles and utilizing the generated pressure.

The image recording method using an ink jet recording device is typically classified into a shuttle scan method (also referred to as "serial head method") in which an image is recorded using a short serial head and a single pass method (also referred to as "line head method") in which an image is recorded using a line head where recording elements are arranged in the entire recording medium in the width direction. In the shuttle scan method, an image is recorded while the serial head is scanned in the width direction of the recording medium. On the contrary, in the single pass method, an image can be recorded on the entire surface of the recording medium by scanning the recording medium in a direction orthogonal to the direction in which the recording elements are arranged. Therefore, the single pass method is different from the shuttle scan method in terms that a transport system such as a carriage that scans the serial head is not required. Further, in the single pass method, movement of the carriage and complicated scanning control between the carriage and the recording medium are unnecessary, and thus only the recording medium moves. Therefore, the recording speed can be increased as compared with the shuttle scan method.

From the viewpoint of ensuring the image quality, the liquid droplet amount of the ink to be jetted from an ink jet head is preferably in a range of 1 pL (picoliter) to 10 pL and more preferably in a range of 1.5 pL to 6 pL. Further, the liquid droplet amount denotes the volume of the ink to be jetted from one nozzle at one time using the ink jet recording method.

In a case where the ink jet head has a nozzle surface on which nozzles for jetting an ink are arranged, the ink jet head may include a moisturizing cap that covers the nozzle surface and forms a moisturizing space with the nozzle surface. A moisturizing liquid can be stored in the moisturizing cap to increase the humidity of the moisturizing space.

It is preferable that the moisturizing liquid contains at least an acetylene glycol-based surfactant, water, and a preservative. The moisturizing liquid may further contain other components such as a basic compound and an antifoaming agent, as necessary. However, the moisturizing liquid is not a liquid for recording an image, and it is preferable that the content of a colorant such as a pigment is less than 0.1% by mass and more preferable that the moisturizing liquid does not contain a colorant.

It is preferable that the moisturizing liquid contains at least one acetylene glycol-based surfactant represented by Formula 6. In a case where the moisturizing liquid contains an acetylene glycol-based surfactant represented by Formula 6, the jettability of the ink immediately after the ink is supplied to the ink jet head is improved.

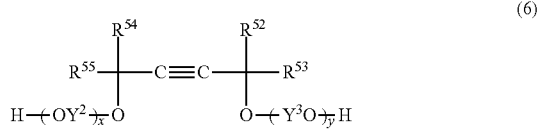

(6)

In Formula 6, $R^{52}$, $R^{53}$, $R^{54}$, and $R^{55}$ each independently represent a hydrogen atom or a linear, branched, or cyclic alkyl group having 1 to 8 carbon atoms. $Y^2$ and $Y^3$ each independently represent an alkylene group having 2 to 6 carbon atoms. x and y represent the average number of added moles and satisfy an expression of $1 \leq x+y \leq 85$.

Examples of the linear, branched, or cyclic alkyl group having 1 to 8 carbon atoms as $R^{52}$ and $R^{54}$ include a methyl group, an ethyl group, an n-propyl group, an isopropyl group, an n-butyl group, an isobutyl group, a 2-butyl group, a t-butyl group, a hexyl group, a cyclohexyl group, and an octyl group. In a case where $R^{52}$ and $R^{54}$ represent a cyclic alkyl group, the number of carbon atoms of the alkyl group is preferably in a range of 3 to 8. $R^{52}$ and $R^{54}$ represent preferably an alkyl group having 1 to 3 carbon atoms and most preferably a methyl group.

Examples of the linear, branched, or cyclic alkyl group having 1 to 8 carbon atoms as $R^{53}$ and $R^{55}$ include a methyl group, an ethyl group, an n-propyl group, an isopropyl group, an n-butyl group, an isobutyl group, a 2-butyl group, a t-butyl group, a hexyl group, a cyclohexyl group, and an octyl group. In a case where $R^{53}$ and $R^{55}$ represent a cyclic alkyl group, the number of carbon atoms of the alkyl group is preferably in a range of 3 to 8. $R^{53}$ and $R^{55}$ represent preferably a linear, branched, or cyclic alkyl group having 3 to 8 carbon atoms and particularly preferably an isobutyl group.

The sum of x and y is in a range of 1 to 85 ($1 \leq x+y \leq 85$), preferably in a range of 3 to 50, more preferably in a range of 3 to 30, and still more preferably in a range of 5 to 30. In a case where the sum of x and y is 3 or greater, the solubility is further improved and the clouding point is further increased. In this manner, separation, precipitation, and the like in a case where the moisturizing liquid is heated to 30° C. or higher are further suppressed. Further, in a case where the sum of x and y is 30 or less, the effects of decreasing the surface tension and improving the wettability are more effectively exhibited. In this manner, the jettability of the ink to be jetted is further enhanced in a case where filling of the ink is carried out after the filling of the moisturizing liquid and the ink is jetted.

$Y^2$ and $Y^3$ each independently represent preferably an alkylene group having 2 to 4 carbon atoms, more preferably an alkylene group having 2 or 3 carbon atoms, and particularly preferably an alkylene group (ethylene group) having 2 carbon atoms. That is, among compounds represented by Formula 6, an acetylene glycol-based surfactant represented by Formula 7 is more preferable.

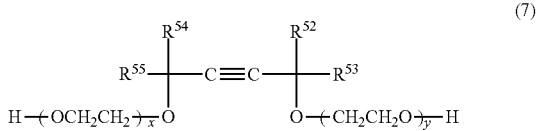

(7)

In Formula 7, $R^{52}$, $R^{53}$, $R^{54}$, $R^{55}$, x, and y each have the same definition as that for $R^{52}$, $R^{53}$, $R^{54}$, $R^{55}$, x, and y in Formula 6, and the preferable ranges thereof are the same as described above.

Examples of the acetylene glycol-based surfactant represented by Formula 6 include an alkylene oxide adduct (preferably an ethylene oxide adduct) such as 2,4,7,9-tetramethyl-5-decyne-4,7-diol, 3,6-dimethyl-4-octyne-3,6-diol, 2,5,8,11-tetramethyl-6-dodecyne-5,8-diol, or 2,5-dimethyl-3-hexyne-2,5-diol. In particular, it is preferable that the acetylene glycol-based surfactant represented by Formula 6 is an ethylene oxide adduct of 2,4,7,9-tetramethyl-5-decyne-4,7-diol ($3 \leq x+y \leq 30$, preferably $5 \leq x+y \leq 30$).

The acetylene glycol-based surfactant represented by Formula 6 may be used alone or mixed with various additives. The acetylene glycol-based surfactant represented by Formula 6 may be a commercially available product on the market. Examples of the commercially available product include SURFYNOL Series (such as SURFYNOL 420, SURFYNOL 440, SURFYNOL 465, and SURFYNOL 485) and OLFINE Series (such as OLFINE E1010 and OLFINE E1020) (manufactured by Air Products Ltd. or Nissin Chemical Industry Co., Ltd.), DYNOL Series (such as DYNOL 604), and ACETYLENOL (manufactured by Kawaken Fine Chemicals Co., Ltd.). Further, commercially available products are also provided by Dow Chemical Company, General Aniline & Film Corporation, and the like.

The content of the acetylene glycol-based surfactant in the moisturizing liquid is preferably in a range of 0.01% by mass to 5% by mass and more preferably in a range of 0.1% by mass to 2% by mass with respect to the total mass of the moisturizing liquid. In a case where the content of the acetylene glycol-based surfactant is in the above-described ranges, the jettability of the ink immediately after the ink is supplied to the ink jet head is improved, and the generation of bubbles in the ink is suppressed. Further, in a case where the moisturizing liquid contains two or more kinds of acetylene glycol-based surfactants, it is preferable that the total amount thereof satisfies the above-described ranges.

The surface tension of the moisturizing liquid can be decreased by allowing the moisturizing liquid to contain an acetylene glycol-based surfactant. The moisturizing liquid having a low surface tension enhances the wettability of the inner wall surface of the ink jet head, and thus the jettability of the ink is improved. From the viewpoint of further suppressing precipitation caused by heating the moisturizing liquid to 30° C. to 90° C., an acetylene glycol-based surfactant having a higher clouding point is preferable. From this viewpoint, an ethylene oxide adduct of 2,4,7,9-tetramethyl-5-decyne-4,7-diol ($3 \leq x+y \leq 30$, more preferably $5 \leq x+y \leq 30$) is most preferable as the acetylene glycol-based surfactant. Examples of commercially available products of the ethylene oxide adduct ($3 \leq x+y \leq 30$) of 2,4,7,9-tetramethyl-5-decyne-4,7-diol include SURFYNOL 440, SURFYNOL 465, and SURFYNOL 485 (manufactured by Air Products Ltd.) and OLFINE E1010 and OLFINE E1020 (manufactured by Nissin Chemical Industry Co., Ltd.).

It is preferable that the moisturizing liquid contains water. That is, the moisturizing liquid is an aqueous liquid. The content of water in the moisturizing liquid is not particularly limited, but is preferably 60% by mass or greater, more preferably 70% by mass or greater, and particularly preferably 80% by mass or greater with respect to the total mass of the moisturizing liquid. The upper limit of the content of water is not particularly limited, but is, for example, 99.8% by mass and preferably 99.5% by mass.

The moisturizing liquid may contain other components such as a basic compound, an organic solvent, and a preservative in addition to the acetylene glycol-based surfactant and water.

The moisturizing liquid may contain at least one basic compound. It is possible to provide a buffering action for preventing the pH from being decreased due to the decomposition of the components contained in the moisturizing liquid in a case where the moisturizing liquid is stored, by allowing the moisturizing liquid to contain a basic compound. From the viewpoint of exhibiting the pH buffering ability in a pH region of the moisturizing liquid, it is preferable that the basic compound is a compound having a pKa value of 6.0 to 8.5. The basic compound may be any of an inorganic compound or an organic compound. From the viewpoint of easily obtaining a desired pKa value and enhancing the solubility, it is preferable that the basic compound is a basic organic compound. Further, the pKa value of the basic organic compound is the pKa value of a conjugate acid.

Examples of the basic compound include cacodylic acid (pKa: 6.2), 2,2-bis (hydroxymethyl)-2,2',2"-nitrilotriethanol (pKa: 6.5), piperazine-N,N'-bis-(2-ethanesulfuric acid) (pKa: 6.8), phosphoric acid (pKa2: 6.86), imidazole (pKa: 7.0), N'-2-hydroxyethylpiperazine-N', 2-ethanesulfuric acid (pKa: 7.6), N-methylmorpholine (pKa: 7.8), triethanolamine (pKa: 7.8), hydrazine (pKa: 8.11), and trishydroxymethyl-aminomethane (pKa: 8.3).

In a case where the moisturizing liquid contains a basic compound, the content of the basic compound in the moisturizing liquid is preferably in a range of 0.0001% by mass to 0.1% by mass and more preferably in a range of 0.001% by mass to 0.01% by mass with respect to the total mass of the moisturizing liquid.

The pH of the moisturizing liquid at 25° C. is not particularly limited, but is preferably in a range of 6.5 to 10 and more preferably in a range of 7 to 9 from the viewpoint of preventing aggregation with the ink components in a case of being mixed with the ink and enhancing the liquid contact resistance of the member inside the ink jet head. The pH of the moisturizing liquid can be adjusted by adding an acid such as nitric acid, sulfuric acid, hydrochloric acid, phosphoric acid, or succinic acid after addition of the basic compound. From the viewpoint of metal corrosion resistance, it is preferable that the acid used for the adjustment is nitric acid.

The moisturizing liquid may contain at least one preservative. Examples of the preservative contained in the moisturizing liquid are the same as the preservatives contained in the ink. Among these, a thiazole-based compound or a benzotriazole-based compound is preferable as the preservative contained in the moisturizing liquid. Examples of the thiazole-based compound include methylisothiazolinone, benzisothiazolin, isothiazolin, 1,2-benzisothiazolin-3-one, 5-chloro-2-methyl-4-isothiazolin-3-one, 2-(thiocyanomethylthio)benzthiazole, 2-mercaptobenzthiazole, and 3-allyloxy-1,2-benzisothiazol-1,1-oxide. Further, as the thiazole-based fungicide, Proxel (registered trademark) Series (BDN, BD20, GXL, LV, XL2), KORDEKMLX, ROCIMA 553, ROCIMA 552, PERMACHEM SK-50H, TOPSIDE 240, TOPSIDE 1000, and Ultra10 (manufactured by Arch Chemicals, Inc.).

The content of the preservative (the total content in a case where the moisturizing liquid contains two or more kinds of preservatives) is preferably in a range of 0.001% by mass to 10% by mass, more preferably in a range of 0.005% by mass to 2.0% by mass, and still more preferably in a range of 0.01% to 0.5% by mass with respect to the total mass of the moisturizing liquid. The effects of the preservative can be efficiently obtained and generation of precipitates can be suppressed by setting the content thereof to be in the above-described ranges.

<Ink Drying Step>

The image recording method according to the present disclosure may include an ink drying step as necessary. The ink drying step is a step of drying water and the organic solvent contained in the ink applied onto the recording medium. The heating means is not particularly limited as long as water and the organic solvent contained in the ink can be dried, and examples thereof include a heat drum, hot air, an infrared lamp, a hot oven, and a heat plate. The heating temperature and heating time are appropriately adjusted according to the contents of water and the organic solvent contained in the ink.

<Heat-Fixing Step>

The image recording method according to the present disclosure may include a heat-fixing step after the ink applying step as necessary. The heat-fixing step is a step of melting and fixing the resin particles contained in the ink. The image is fixed on the recording medium by performing the heat-fixing step, and thus the rub resistance of the image can be improved. As the heat-fixing step, for example, the heat-fixing step described in paragraphs 0112 to 0120 of JP2010-221415A can be employed.

EXAMPLES

Hereinafter, the embodiments of the present disclosure will be described in detail with reference to examples, but the present disclosure is not limited thereto. "Part" is on a mass basis.

In the examples, the volume average particle diameter was measured by a particle size distribution measuring device (product name, "MICROTRAC UPA (registered trademark) EX150", manufactured by NIKKISO CO., LTD.).

The weight-average molecular weight was measured using HLC (registered trademark)-8020GPC (manufactured by Tosoh Corporation) as a measuring device, three columns of TSKgel (registered trademark), Super Multipore, HZ-H (manufactured by Tosoh Corporation, 4.6 mmID×15 cm), and tetrahydrofuran (THF) as an eluent. Further, the measurement was performed under measurement conditions of a sample concentration of 0.45% by mass, a flow rate of 0.35 ml/min, a sample injection volume of 10 μL, and a measurement temperature of 40° C. using an RI detector. Further, the calibration curve was prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

The glass transition temperature was measured using a differential scanning calorimeter (product name, "EXSTAR 6220", manufactured by SII Nanotechnology Inc.).

The dynamic surface tension at 10 ms was measured using, for example, a bubble pressure type dynamic surface tension meter (product name, "BP100", manufactured by KRUSS).

(Preparation of Resin Particles)
<Preparation of Resin Particles C-1>

A three-neck flask equipped with a stirrer, a thermometer, a reflux condenser, and a nitrogen gas introduction pipe was charged with water (250 g), 12-methacrylamide dodecanoic acid (7.0 g), potassium hydrogen carbonate (0.17 g), and isopropanol (20 g) and was heated to 85° C. under a nitrogen stream. Here, a mixed solution consisting of 4,4'-azobis(4-cyanovaleric acid) (radical polymerization initiator, product name, "V-501", manufactured by FUJIFILM Wako Pure Chemical Corporation) (0.11 g), potassium hydrogen carbonate (0.08 g), and water (9 g) was added thereto, and the mixture was stirred for 10 minutes. Next, a monomer solution consisting of styrene (30 g) and methyl methacrylate (63 g) was added dropwise to the three-neck flask at a constant speed such that the dropwise addition was completed in 3 hours. Further, a mixed solution consisting of V-501 (0.06 g), potassium hydrogen carbonate (0.04 g), and water (6 g) was added to the solution twice, immediately after the start of dropwise addition of the monomer solution and 1.5 hours after the start of dropwise addition of the monomer solution. After completion of the dropwise addition of the monomer solution, the mixed solution was stirred for 1 hour. Subsequently, a mixed solution consisting of V-501 (0.06 g), potassium hydrogen carbonate (0.04 g), and water (6 g) was added to the obtained reaction mixture, and the mixture was further stirred for 3 hours. The obtained reaction mixture was filtered through a mesh having a mesh size of 50 μm, thereby obtaining an aqueous dispersion liquid of resin particles C-1. The obtained aqueous dispersion liquid of the resin particles C-1 had a pH of 8.5, a concentration of solid contents of 25% by mass, a volume average particle diameter of 30 nm, a weight-average molecular weight (Mw) of 250000, and a Tg of 96° C.

<Preparation of Resin Particles C-2, C-6, C-10, C-11, C-21 to C-30, and Resin Particles D to F>

Resin particles C-2, C-6, C-10, C-11, C-21 to C-30, and D to F were prepared by the same method as that for the resin particles C-1 except that the kind and the amount of the monomer to be used were changed to the kind and the amount described below in the preparation of the resin particles C-1. The resin particles D are resin particles that do not have a structural unit containing an anionic group represented by Formula 3.

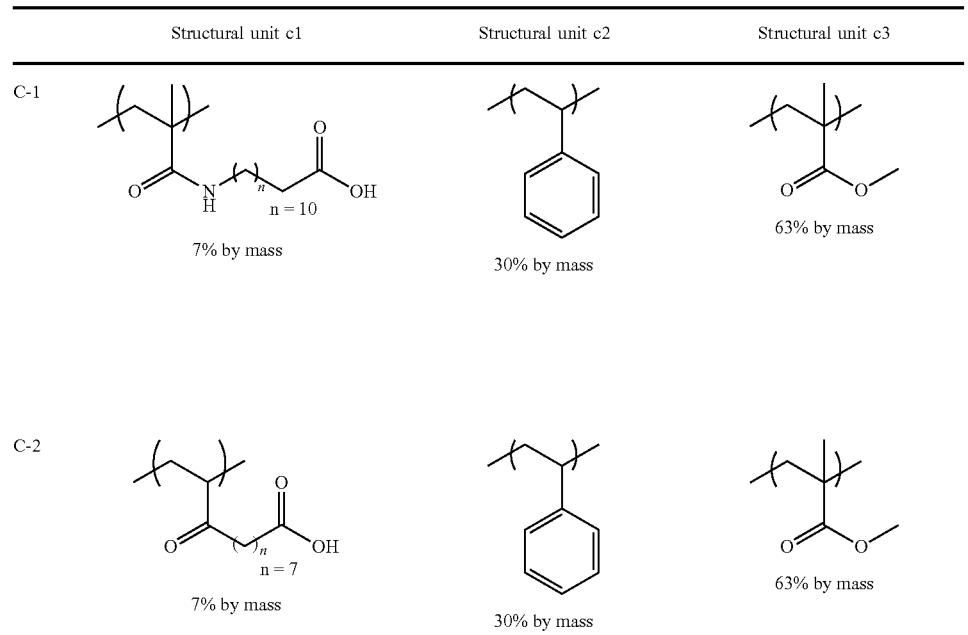

-continued

| | Structural unit c1 | Structural unit c2 | Structural unit c3 |
|---|---|---|---|
| C-6 | acrylamide-(CH₂)ₙ-COOH, n=10, 8% by mass | styrene, 30% by mass | methyl acrylate, 67% by mass |
| C-10 | acrylamide-(CH₂)ₙ-COOH, n=10, 7% by mass | benzyl acrylate, 30% by mass | methyl acrylate, 63% by mass |
| C-21 | acrylamide-(CH₂)ₙ-COOH, n=10, 7% by mass | styrene, 30% by mass | butyl acrylate, 63% by mass |
| C-22 | acrylamide-(CH₂)ₙ-COOH, n=10, 15% by mass | styrene, 85% by mass | — |

| | Structural unit c1 | Structural unit c2 |
|---|---|---|
| C-23 | acrylate-O-(CH₂)ₙ-COOH, n=10, 7% by mass | styrene, 30% by mass |
| C-24 | acrylamide-(CH₂)ₙ-COOH, n=18, 15% by mass | styrene, 30% by mass |

-continued
C-25 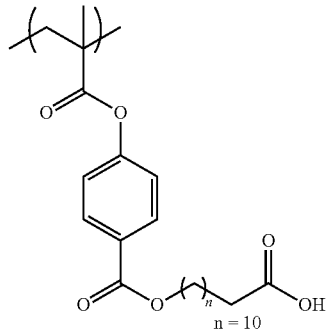 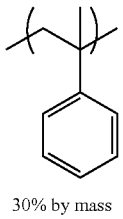
15% by mass
30% by mass
—
C-26 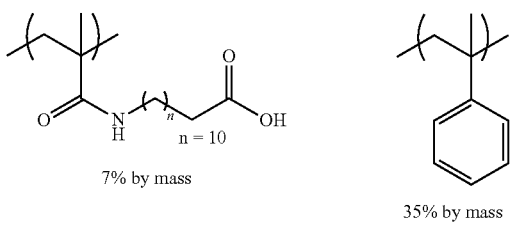 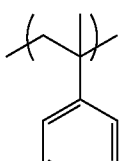
7% by mass
35% by mass
—
C-27 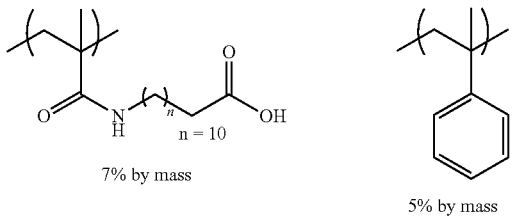 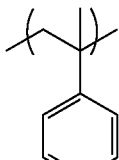 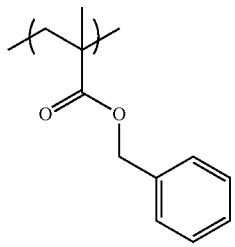
7% by mass
5% by mass
30% by mass
C-28 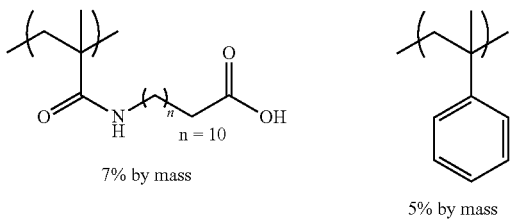 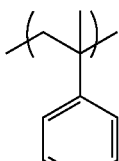 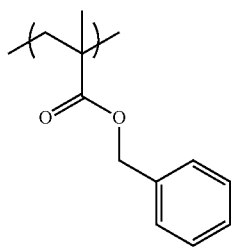
7% by mass
5% by mass
30% by mass
C-29 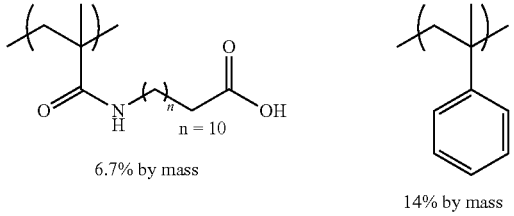 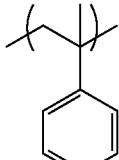 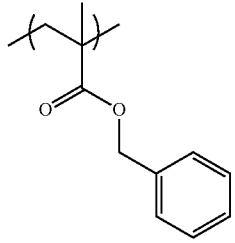
6.7% by mass
14% by mass
14% by mass -continued
C-30 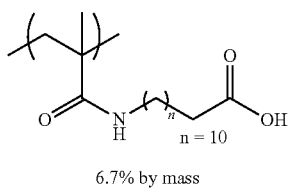
6.7% by mass
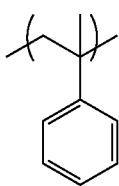
14% by mass
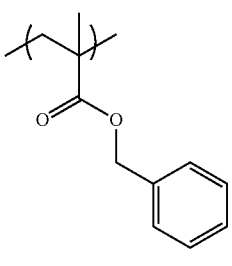
14% by mass
| Structural unit c3 | | |
|---|---|---|
C-23 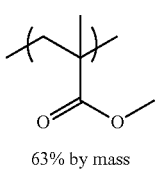
63% by mass
— —
C-24 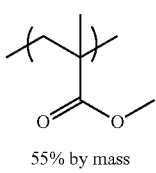
55% by mass
— —
C-25 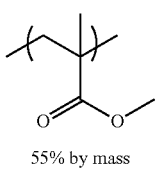
55% by mass
— —
C-26 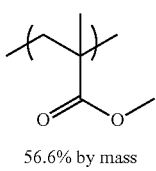
56.6% by mass
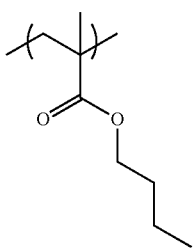
1.4% by mass
—
C-27 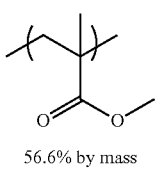
56.6% by mass
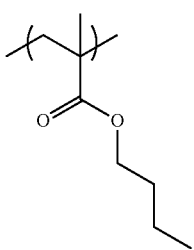
1.4% by mass
—

-continued
C-28
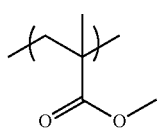
42.6% by mass
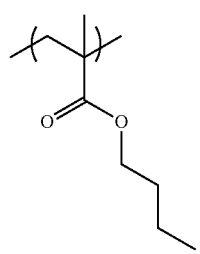
1.4% by mass
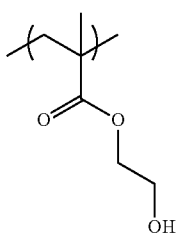
14% by mass
C-29
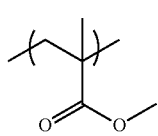
48% by mass
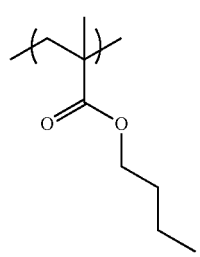
3.3% by mass
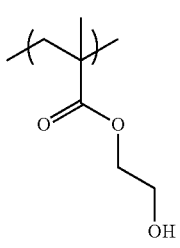
14% by mass
C-30
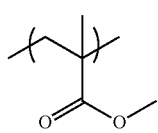
30% by mass
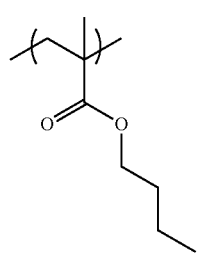
3.3% by mass
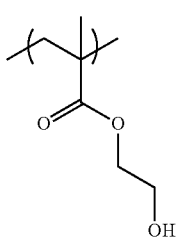
32% by mass
| | Structural unit containing anionic group | Structural unit c2 | Structural unit c3 |
|---|---|---|---|
| D | 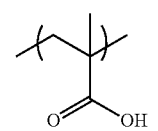<br>7% by mass | 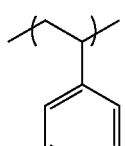<br>30% by mass | 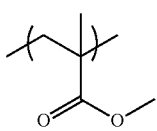<br>63% by mass |
| | Structural unit c1 | Structural unit c2 | Structual unit c3 |
|---|---|---|---|
| E | 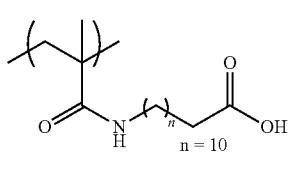<br>n = 10<br>0.8% by mass | 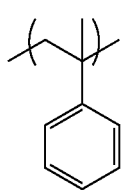<br>30% by mass | 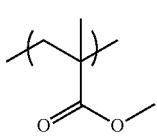<br>69.2% by mass |

F

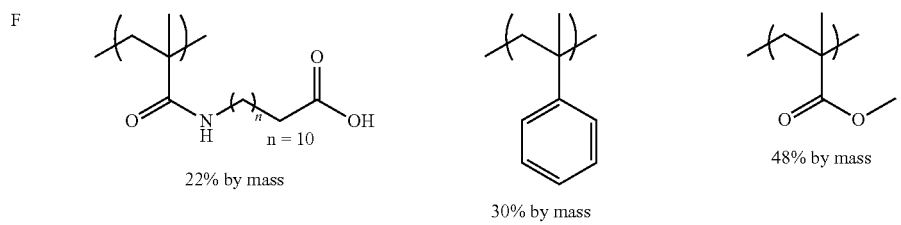

(Preparation of Pigment Dispersion Liquid)
—Synthesis of Dispersant—

A monomer feed composition was prepared by mixing methacrylic acid (172 parts), benzyl methacrylate (828 parts), and isopropanol (375 parts). Further, an initiator feed composition was prepared by mixing 2,2-azobis(2-methylbutyronitrile) (22.05 parts) and isopropanol (187.5 parts). Next, isopropanol (187.5 parts) was heated to 80° C. in a nitrogen atmosphere, and a mixture of the monomer feed composition and the initiator feed composition was added dropwise thereto for 2 hours. After completion of the dropwise addition, the obtained solution was further maintained at 80° C. for 4 hours and then cooled to 25° C. After the solution was cooled, the solvent was removed under reduced pressure, thereby obtaining an uncrosslinked polymer Q1 (methacrylic acid/benzyl methacrylate copolymer) having a weight-average molecular weight (Mw) of approximately 30000 and an acid value of 112 mgKOH/g.

—Preparation of Magenta Pigment Dispersion Liquid—

0.8 equivalents of the amount of methacrylic acid in the obtained uncrosslinked polymer Q1 (150 parts) were neutralized with a potassium hydroxide aqueous solution, thereby obtaining an uncrosslinked polymer Q2 (potassium salt of methacrylic acid/benzyl methacrylate copolymer). Ion exchange water was added thereto such that the concentration of the uncrosslinked polymer Q2 reached 25% by mass to obtain an uncrosslinked polymer Q2 aqueous solution.

The uncrosslinked polymer Q2 aqueous solution (124 parts), a magenta pigment (48 parts), water (75 parts), and dipropylene glycol (30 parts) were mixed, a dispersion treatment was performed until a desired volume average particle diameter was obtained using a beads mill (bead diameter of 0.1 mmφ, zirconia beads), thereby obtaining a magenta pigment dispersion liquid P1 having a pigment concentration of 15% by mass. The magenta pigment dispersion liquid P1 is a pigment dispersion liquid in which the magenta pigment is dispersed by the uncrosslinked polymer Q2. The uncrosslinked polymer Q2 is a dispersant having no crosslinked structure.

Trimethylolpropane polyglycidyl ether (product name, "Denacol EX-321", manufactured by Nagase ChemteX Corporation) (1.3 parts) serving as a crosslinking agent and a boric acid aqueous solution (concentration of boric acid: 4% by mass) (14.3 parts) were added to the magenta pigment dispersion liquid P1 (136 parts), and the mixture was allowed to react at 50° C. for 6 hours and cooled to 25° C., thereby obtaining a mixture. In this manner, the uncrosslinked polymer Q2 in the magenta pigment dispersion liquid was crosslinked. Hereinafter, the crosslinked substance of the uncrosslinked polymer Q2 will be referred to as "crosslinked polymer Q3". Next, ion exchange water was added to the mixture, and ultrafiltration was performed using a stirring type ultra holder (manufactured by ADVANTEC) and an ultrafiltration filter (manufactured by ADVANTEC, molecular weight cutoff of 50000, Q0500076E ultrafilter). After purification carried out such that the concentration of dipropylene glycol in the mixture reached 0.1% by mass or less, the mixture was concentrated to a pigment concentration of 15% by mass, thereby obtaining a pigment dispersion liquid P2. The pigment dispersion liquid P2 is a pigment dispersion liquid in which a magenta pigment is dispersed by the crosslinked polymer Q3. The crosslinked polymer Q3 is a dispersant having a crosslinked structure.

As described above, a pigment dispersion liquid P1 in which the magenta pigment was dispersed by the uncrosslinked polymer Q2 and a pigment dispersion liquid P2 in which the magenta pigment was dispersed by the crosslinked polymer Q3 were obtained.

Example 1

Respective components were mixed to have the following composition. Coarse particles were removed from the mixed solution using a 1 μm filter to prepare an ink.
(Composition)

Magenta pigment dispersion liquid P2: amount set such that pigment concentration reached 5% by mass Organic solvent: ethylene glycol monohexyl ether (Clog P value: 1.8986): 3% by mass Aqueous dispersion liquid of resin particles C-1: amount set such that concentration of resin particles C-1 reached 6% by mass Silicone-based surfactant: 0.1% by mass Water: remainder (% by mass) set such that total amount reached 100% by mass Examples 2 to 28 and Comparative Examples 1 to 8

Each ink was prepared by the same method as in Example 1 except that the kind of the dispersant, the kind and the content (% by mass) of the organic solvent, the kind of the resin particles, and the kind and the content (% by mass) of the silicone-based surfactant were changed as listed in Tables 1 and 2.

Hereinafter, each component contained in the ink of each example and each comparative example will be described.
(Pigment)

Magenta pigment (Pigment Red 122)
(Dispersant)

Dispersant having crosslinked structure: crosslinked polymer Q3 shown above

Dispersant having no crosslinked structure: uncrosslinked polymer Q2 shown above Further, in Examples 1 to 27 and Comparative Examples 1 to 8, each ink was prepared using the magenta pigment dispersion liquid P2. Further, in Example 28, an ink was prepared using the magenta pigment dispersion liquid P1. Tables 1 and 2 describe whether the dispersant has a crosslinked structure.

(Organic solvent)

Ethylene glycol monohexyl ether (EGmHE): in Formula 1, a compound in which $R^1$ represents a hydrogen atom, $R^2$ represents an n-hexyl group, and n represents 1

Diethylene glycol monohexyl ether (DEGmHE): in Formula 1, a compound in which $R^1$ represents a hydrogen atom, $R^2$ represents an n-hexyl group, and n represents 2

1,2-Octanediol: in Formula 2, a compound in which $R^2$ represents an n-hexyl group Diethylene glycol mono-2-ethylhexyl ether (DEGmEHE): in Formula 1, a compound in which $R^1$ represents a hydrogen atom, $R^2$ represents a 2-ethylhexyl group, and n represents 2

1,2-Butanediol: in Formula 2, a compound in which $R^2$ represents an ethyl group Diethylene glycol dibutyl ether (DEGDBE): a compound that does not correspond to the compound represented by Formula 1 or Formula 2.

(Resin Particles)

The resin particles C-2, C-6, C-10, C-11, C-21 to C-30, and D to F prepared as described above were used.

(Surfactant)

—Silicone-Based Surfactant—

BYK-347: polyether-modified silicone (manufactured by BYK)

BYK-348: polyether-modified silicone (manufactured by BYK)

BYK-349: polyether-modified silicone (manufactured by BYK)

BYK-3450: polyether-modified silicone (manufactured by BYK)

BYK-3451: polyether-modified silicone (manufactured by BYK)

BYK-375: polyether ester-modified hydroxyl group-containing polydimethylsiloxane (manufactured by BYK)

BYK-024: mixture of defoaming polysiloxane, hydrophobic particles, and polyglycol (manufactured by BYK).

Fluorine-based surfactant—

Capstone FS-3100: manufactured by DuPont

<Image Recording>

The ink of each example and each comparative example was jetted by a single pass method under the following conditions using coated paper (trade name, "OK TOP COAT+", manufactured by Oji Paper Co., Ltd.) as a recording medium, to record an image.

Head: 1,200 dpi (dot per inch, 1 inch=2.54 cm)/20-inch width piezo full line head Amount of ink jetted: 2.6 μL Driving frequency: 30 kHz (base material transportation speed of 635 mm/sec)

The graininess and the jettability were evaluated using the inks of the examples and the comparative examples. The evaluation results are listed in Tables 1 and 2. The evaluation method is as follows.

<Graininess>

The graininess of the image was evaluated by recording one image having a recording duty of 80% and visually observing the image of the obtained image recorded material. The evaluation standards are as follows. A rating of 3 or higher is within a practically acceptable range.

5: Graininess was not observed.
4: A trace amount of graininess was observed.
3: A small amount of graininess was observed.
2: Graininess was observed.
1: A significant amount of graininess was observed.

<Jettability>

After one solid image was recorded with a recording duty of 100%, the ink jet recording device was stopped. The ink jet head was exposed to the atmosphere for 10 minutes under the conditions of 25° C. and 50% RH. After 10 minutes, one nozzle check pattern of the ink jet recording device was recorded. The recorded nozzle check pattern was visually observed, and the jettability of the ink was evaluated based on the number of non-jetting nozzles (unit: number). The evaluation standards are as follows. A rating of 3 or higher is within a practically acceptable range.

Further, the recording duty of 100% is defined as an image recorded under the condition that one drop of approximately 2.6 pL of ink is applied to a unit area (1 pixel) of $\frac{1}{1200}$ inch×$\frac{1}{1200}$ inch with a resolution of 1200 dpi×1200 dpi.

5: The number of non-jetting nozzles was zero.
4: The number of non-jetting nozzles was 1 or 2.
3: The number of non-jetting nozzles was in a range of 3 to 5.
2: The number of non-jetting nozzles was in a range of 6 to 10.
1: The number of non-jetting nozzles was 11 or greater.

TABLE 1

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Pigment |  | 5 | 5 | 5 | 5 | 5 | 5 | 5 | 5 | 5 | 5 |
| Dispersant | Presence of crosslinked structure | Present | Present | Present | Present | Present | Present | Present | Present | Present | Present |
| Organic solvent | EgmHE (Clog P value: 1.8986) | 3 | 2.5 | — | — | — | 3 | 3 | 3 | 3 | 3 |
|  | DEGmHE (Clog P value: 1.723) | — | — | 3 | — | — | — | — | — | — | — |
|  | 1,2-Octanediol (Clog P value: 1.5848) | — | — | — | 3 | — | — | — | — | — | — |
|  | DEGmEHE (Clog P value: 2.651) | — | — | — | — | 3 | — | — | — | — | — |

TABLE 1-continued

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Resin particles | Resin particles C-1 | 6 | 6 | 6 | 6 | 6 | — | — | — | — | — |
|  | Resin particles C-2 | — | — | — | — | — | 6 | — | — | — | — |
|  | Resin particles C-6 | — | — | — | — | — | — | 6 | — | — | — |
|  | Resin particles C-10 | — | — | — | — | — | — | — | 6 | — | — |
|  | Resin particles C-21 | — | — | — | — | — | — | — | — | 6 | — |
|  | Resin particles C-22 | — | — | — | — | — | — | — | — | — | 6 |
| Silicone-based surfactant | BYK-347 | 0.1 | 0.1 | 0.1 | 0.1 | 0.1 | 0.1 | 0.1 | 0.1 | 0.1 | 0.1 |
| Dynamic surface tension (mN/m) |  | 30 | 33 | 33 | 33 | 30 | 30 | 30 | 30 | 30 | 30 |
| Evaluation | Graininess | 5 | 4 | 4 | 4 | 5 | 5 | 5 | 5 | 5 | 5 |
|  | Jettability | 5 | 5 | 5 | 5 | 5 | 4 | 5 | 5 | 5 | 5 |

TABLE 2

|  |  | Example 11 | Example 12 | Example 13 | Example 14 | Example 15 | Example 16 | Example 17 | Example 18 |
|---|---|---|---|---|---|---|---|---|---|
| Pigment |  | 5 | 5 | 5 | 5 | 5 | 5 | 5 | 5 |
| Dispersant | Presence of crosslinked structure | Present | Present | Present | Present | Present | Present | Present | Present |
| Organic solvent | EgmHE (Clog P value: 1.8986) | 3 | 3 | 3 | 3 | 3 | 3 | 3 | 3 |
| Resin particles | Resin particles C-23 | 6 | — | — | — | — | — | — | — |
|  | Resin particles C-24 | — | 6 | — | — | — | — | — | — |
|  | Resin particles C-25 | — | — | 6 | — | — | — | — | — |
|  | Resin particles C-26 | — | — | — | 6 | — | — | — | — |
|  | Resin particles C-27 | — | — | — | — | 6 | — | — | — |
|  | Resin particles C-28 | — | — | — | — | — | 6 | — | — |
|  | Resin particles C-29 | — | — | — | — | — | — | 6 | — |
|  | Resin particles C-30 | — | — | — | — | — | — | — | 6 |
| Silicone-based surfactant | BYK-347 | 0.1 | 0.1 | 0.1 | 0.1 | 0.1 | 0.1 | 0.1 | 0.1 |
| Dynamic surface tension (mN/m) |  | 30 | 30 | 30 | 30 | 30 | 30 | 30 | 30 |
| Evaluation | Graininess | 5 | 5 | 5 | 5 | 5 | 5 | 5 | 5 |
|  | Jettability | 5 | 5 | 5 | 5 | 5 | 5 | 5 | 5 |

TABLE 3

|  |  | Example 19 | Example 20 | Example 21 | Example 22 | Example 23 | Example 24 | Example 25 | Example 26 | Example 27 | Example 28 |
|---|---|---|---|---|---|---|---|---|---|---|---|
| Pigment |  | 5 | 5 | 5 | 5 | 5 | 5 | 5 | 5 | 5 | 5 |
| Dispersant | Presence of crosslinked structure | Present | Present | Present | Present | Present | Present | Present | Present | Present | Absent |
| Organic solvent | EgmHE (Clog P value: 1.8986) | 3 | 3 | 3 | 3 | 3 | 3 | 2 | 3 | 3 | — |
|  | DEGmHE (Clog P value: 1.723) | — | — | — | — | — | — | — | — | — | 3 |
| Resin particles | Resin particles C-1 | 6 | 6 | 6 | 6 | 6 | 6 | 6 | 6 | 6 | 6 |
| Silicone-based surfactant | BYK-347 | — | — | — | — | — | — | 0.1 | 0.02 | 0.9 | 0.1 |
|  | BYK-348 | 0.1 | — | — | — | — | — | — | — | — | — |
|  | BYK-349 | — | 0.1 | — | — | — | — | — | — | — | — |
|  | BYK-3450 | — | — | 0.1 | — | — | — | — | — | — | — |
|  | BYK-3451 | — | — | — | 0.1 | — | — | — | — | — | — |
|  | BYK-375 | — | — | — | — | 0.1 | — | — | — | — | — |
|  | BYK-024 | — | — | — | — | — | 0.1 | — | — | — | — |
| Dynamic surface tension (mN/m) |  | 30 | 30 | 36 | 30 | 30 | 30 | 36 | 30 | 30 | 33 |
| Evaluation | Graininess | 5 | 5 | 5 | 5 | 5 | 5 | 3 | 5 | 3 | 3 |
|  | Jettability | 5 | 5 | 5 | 5 | 3 | 3 | 5 | 4 | 5 | 3 |

TABLE 4

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Pigment |  | 5 | 5 | 5 | 5 | 5 | 5 | 5 | 5 |
| Dispersant | Presence of crosslinked structure | Present | Present | Present | Present | Present | Present | Present | Present |
| Organic solvent | EgmHE (Clog P value: 1.8986) | 3 | 2 | 3 | 3 | — | 3 | 3 | — |
|  | 1,2-butanediol (Clog P value: −0.5312) | — | — | — | — | 3 | — | — | — |
|  | DEGDBE (Clog P value: 2.6348) | — | — | — | — | — | — | — | 3 |
| Resin particles | Resin particles C-1 | 6 | 6 | 6 | — | 6 | — | — | 6 |
|  | Resin particles D | — | — | — | 6 | — | — | — | — |
|  | Resin particles E | — | — | — | — | — | 6 | — | — |
|  | Resin particles F | — | — | — | — | — | — | 6 | — |
| Silicone-based surfactant | BYK-347 | — | — | — | 0.1 | 0.1 | 0.1 | 0.1 | 0.1 |
|  | BYK-348 | — | — | — | — | — | — | — | — |
|  | BYK-024 | — | — | — | — | — | — | — | — |
| Fluorine-based surfactant | CapstonFS-3100 | 0.1 | 0.1 | — | — | — | — | — | — |
| Dynamic surface tension (mN/m) |  | 30 | 36 | 30 | 30 | 45 | 30 | 30 | 40 |
| Evaluation | Graininess | 5 | 3 | 5 | 5 | 1 | 5 | 5 | 1 |
|  | Jettability | 1 | 2 | 1 | 1 | 5 | 2 | 2 | 5 |

As listed in Tables 1 to 3, it was found that since the inks of Examples 1 to 28 contained a pigment, a dispersant having a crosslinked structure, an organic solvent which was at least one selected from the group consisting of a compound represented by Formula 1 and a compound represented by Formula 2 and had a Clog P value of 1.0 to 3.5, resin particles which contained a resin having 1% by mass to 20% by mass of a structural unit represented by Formula 3 with respect to the total mass of the resin, a silicone-based surfactant, and water, the obtained image had excellent graininess and the jettability of the ink was excellent.

On the contrary, as listed in Table 4, it was found that since the inks of Comparative Examples 1 and 2 contained a fluorine-based surfactant in place of a silicone-based surfactant, the jettability of each ink was degraded.

In Comparative Example 3, it was found that since the ink contained no silicone-based surfactant, the jettability of the ink was degraded.

In Comparative Example 4, it was found that since the resin particles contained in the ink had no structural unit represented by Formula 3, the jettability of the ink was degraded.

In Comparative Example 5, it was found that since the organic solvent contained in the ink had a Clog P value of −0.5312, which was low, the graininess of the obtained image was degraded.

In Comparative Example 6, it was found that since the resin particles contained in the ink had only 0.8% by mass of the structural unit represented by Formula 3 with respect to the total mass of the resin, the jettability of the ink was degraded.

In Comparative Example 7, it was found that the resin particles contained in the ink had 22% by mass of the structural unit represented by Formula 3 with respect to the total mass of the resin, the jettability of the ink was degraded.

In Comparative Example 8, it was found that since the organic solvent contained in the ink was not a compound represented by Formula 1 or 2, the graininess of the obtained image was degraded.

In Examples 1 and 11, it was found that the dynamic surface tension of the ink after 10 ms was 35 mN/m or less, and thus the graininess of the obtained image was excellent as compared with Example 25.

In Example 1, it was found that the content of the organic solvent represented by Formula 1 or Formula 2 and having a Clog P value of 1.0 to 3.5 was 2.5% by mass or greater with respect to the total mass of the ink, and thus the graininess of the obtained image was excellent as compared with Example 25.

In Example 1, it was found that the content of the silicone-based surfactant was 0.03% by mass or greater with respect to the total mass of the ink, and thus the jettability of the ink was excellent as compared with Example 26.

In Example 1, it was found that the content of the silicone-based surfactant was 0.8% by mass or less with respect to the total mass of the ink, and thus the graininess of the obtained image was excellent as compared with Example 27.

Examples 1 and 6 to 18 are examples in which resin particles having various structural units were used. All the resin particles are resin particles containing a resin having 1% by mass to 20% by mass of a structural unit represented by Formula 3 with respect to the total mass of the resin. As shown in Examples 1 and 6 to 18, it was found that the obtained images had excellent graininess and excellent jettability of the ink.

The present disclosure of JP2020-058271 filed on Mar. 27, 2020 is incorporated herein by reference in its entirety. Further, all documents, patent applications, and technical standards described in the present specification are incorporated herein by reference to the same extent as in a case of being specifically and individually noted that individual documents, patent applications, and technical standards are incorporated by reference.

What is claimed is:

1. An ink jet recording ink comprising:
   a pigment;
   a dispersant;

an organic solvent which is at least one selected from the group consisting of a compound represented by Formula 1 and a compound represented by Formula 2 and has a Clog P value of 1.0 to 3.5;
resin particles which contain a resin having 1% by mass to 20% by mass of a structural unit represented by Formula 3 with respect to a total mass of the resin;
a silicone-based surfactant; and
water,

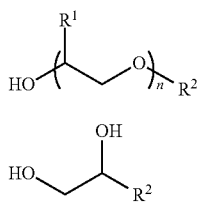
(1)

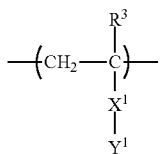
(2)

wherein, in Formula 1 or 2, $R^1$s each independently represent a hydrogen atom or a methyl group, $R^2$s each independently represent a linear or branched hydrocarbon group having 4 to 9 carbon atoms, or an aryl group having 6 to 10 carbon atoms, and n represents an integer of 1 to 3, $$-\!\!\left(\!CH_2\!-\!\!\underset{\underset{Y^1}{\overset{X^1}{|}}}{\overset{R^3}{\underset{|}{C}}}\!\right)\!\!- \quad (3)$$

in Formula 3, $R^3$ represents a hydrogen atom or an alkyl group having 1 to 4 carbon atoms, $X^1$ represents a divalent linking group, $Y^1$ represents an anionic group, and an atom included in $X^1$ or $Y^1$ and farthest from a main chain is separated from the main chain by a distance of 4 atoms to 27 atoms.

2. The ink jet recording ink according to claim 1, having a dynamic surface tension at 10 milliseconds of 35 mN/m or less.

3. The ink jet recording ink according to claim 1, wherein a content of the organic solvent is 2.5% by mass or greater with respect to a total mass of the ink.

4. The ink jet recording ink according to claim 1, wherein a content of the silicone-based surfactant is in a range of 0.03% by mass to 0.8% by mass with respect to a total mass of the ink.

5. The ink jet recording ink according to claim 1, wherein the resin has 5% by mass to 90% by mass of a structural unit derived from an ethylenically unsaturated compound having an aromatic ring structure or an alicyclic structure with respect to the total mass of the resin.

6. An image recording method comprising:
applying the ink jet recording ink according to claim 1 onto a recording medium using an ink jet recording method, to record an image.

7. The ink jet recording ink according to claim 1, wherein the dispersant is a polymer having a crosslinked structure.

8. The ink jet recording ink according to claim 1, wherein in Formula 3, an atom included in $X^1$ or $Y^1$ and farthest from a main chain is separated from the main chain by a distance of 12 atoms to 27 atoms.

* * * * *